(12) United States Patent
Gustman

(10) Patent No.: US 6,549,911 B2
(45) Date of Patent: *Apr. 15, 2003

(54) METHOD AND APPARATUS FOR CATALOGUING MULTIMEDIA DATA

(75) Inventor: Samuel Gustman, Santa Monica, CA (US)

(73) Assignee: Survivors of the Shoah Visual History Foundation, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/788,310

(22) Filed: Feb. 16, 2001

(65) Prior Publication Data

US 2002/0052861 A1 May 2, 2002

Related U.S. Application Data

(63) Continuation of application No. 09/184,921, filed on Nov. 2, 1998, now Pat. No. 6,212,527.

(51) Int. Cl.⁷ .............................................. G06F 17/30
(52) U.S. Cl. ................................. 707/102; 707/104.1
(58) Field of Search ........................... 707/102, 104.1, 707/103, 10, 3

(56) References Cited

U.S. PATENT DOCUMENTS

| | | | |
|---|---|---|---|
| 5,010,500 A | 4/1991 | Makkuni et al. | |
| 5,119,474 A | 6/1992 | Beitel et al. | 395/807 |
| 5,121,470 A | 6/1992 | Trautman | 395/140 |
| 5,123,088 A | 6/1992 | Kasahara et al. | 395/357 |
| 5,210,868 A | 5/1993 | Shimada et al. | 395/615 |
| 5,241,671 A * | 8/1993 | Reed et al. | 707/104 |
| 5,274,758 A | 12/1993 | Beitel et al. | 395/62 |
| 5,278,946 A | 1/1994 | Shimada et al. | 395/62 |
| 5,280,573 A | 1/1994 | Kuga et al. | 395/338 |
| 5,303,296 A | 4/1994 | Zucker | 379/67 |
| 5,404,506 A | 4/1995 | Fujisawa et al. | 395/604 |
| 5,408,655 A | 4/1995 | Oren et al. | 395/601 |
| 5,414,644 A * | 5/1995 | Seaman et al. | 702/183 |
| 5,428,774 A | 6/1995 | Takahashi et al. | 395/612 |
| 5,461,611 A | 10/1995 | Drake, Jr. et al. | 370/420 |
| 5,493,677 A | 2/1996 | Balogh et al. | 395/615 |
| 5,515,490 A | 5/1996 | Buchanan et al. | 345/302 |
| 5,608,900 A | 3/1997 | Dockter et al. | 395/613 |
| 5,613,909 A * | 3/1997 | Stelovsky | 463/1 |
| 5,615,112 A | 3/1997 | Liu Sheng et al. | 395/615 |
| 5,617,119 A | 4/1997 | Briggs et al. | 395/611 |
| 5,630,121 A * | 5/1997 | Braden-Harder et al. | 707/102 |
| 5,630,125 A * | 5/1997 | Zellweger | 707/103 |
| 5,682,330 A | 10/1997 | Seaman et al. | 364/551.01 |
| 5,724,605 A | 3/1998 | Wissner | 395/806 |
| 5,832,495 A * | 11/1998 | Gustman | 707/103 |
| 5,867,709 A * | 2/1999 | Lang et al. | 707/1 |
| 6,212,527 B1 * | 4/2001 | Gustman | 707/102 |

\* cited by examiner

*Primary Examiner*—Diane D. Mizrahi
(74) *Attorney, Agent, or Firm*—The Hecker Law Group

(57) ABSTRACT

The mechanism catalogues data such as multimedia data. A catalogue is a collection of one or more catalogue elements. An index is used to access a catalogue. An element of a catalogue has one or more attributes. An attribute provides information that can be used to search for, answer questions about, and navigate through a catalogue. An attribute of a catalogue element can be an element that has attributes. A catalogue element attribute that is an element is referred to as an attribute element. Attribute elements and attributes are used to build an index that can be used to facilitate catalogue access. Within a catalogue, smaller catalogues can be created by, for example, querying and user designation.

34 Claims, 34 Drawing Sheets

METHOD AND APPARATUS FOR CATALOGUING MULTIMEDIA DATA

This is a continuation of application Ser. No. 09/184,921 filed Nov. 2, 1998, now U.S. Pat. No. 6,212,527.

BACKGROUND OF THE INVENTION

1. Field of the Invention

This invention relates to the cataloguing multimedia data and including storage and retrieval mechanisms.

2. Background

Increasingly, computer systems are being used to present multimedia material. Such material is usually in the form of text, graphics, video, animation, and sound. Two or more of these data types are usually combined to form the multimedia data presented by the computer system. A computer system that is used to present multimedia material is called a multimedia system. A problem with prior art multimedia systems is an inability to search and retrieve multimedia data.

One prior art multimedia system uses a disk operating system that includes a file system for storing and retrieving files containing multimedia data. The file system catalogues the files based on the names given to the files. The file system can be used to retrieve a file that contains multimedia data based on the file's name. Other than the extent to which the file name identifies content, the file system does not provide the ability to retrieve multimedia information based on the content of the data. The search system provided by a file system is therefore inadequate to search with greater detail than that provided in a file name. A number of prior art multimedia systems are described below.

A search system is described in U.S. Pat. No. 5,241,671, Reed et al., issued on Aug. 31, 1993 relates to a multimedia system that includes a database that is comprised of words, phrases, numbers, letters, maps, charts, pictures, moving images, animations, and audio information. A search capability is provided that provides a series of entry paths for locating information in the database. An entry path allows a user to enter a search request that consists of a set of valid terms or stop terms. A stop term is a term that exists on a stop term list and may be the words "the" or "a", for example. Valid terms are linked to related terms using a stem index. A stem index contains a root term and a set of stems for each term that is related to the root word. For example, the word leaf is linked to terms "leaves" and "leafing".

The creating and displaying of navigators for locating and accessing visual/image information is described in U.S. Pat. No. 5,123,088, Kasahara et al., issued on Jun. 16, 1992. Image information is categorized and linked in a circular list and ordered according to their attributes. When an image unit is displayed, the linked image units can be displayed as reduced images, or navigators. A user can navigate through a network of linked image units by selecting the desired navigator.

A system for database retrieval wherein entries in different databases are retrieved by a process of matching key words of the databases is described in U.S. Pat. No. 5,210,868, Shimada et al., issued on May 11, 1993. Examples of two such databases are a mapping database and a customer attribute database. A dictionary is used to separate a keyword from a first database into common and proper noun subparts. Common and proper noun synonyms are inferred according to a set of rules. The synonyms are combined using a combination rule and then compared with keywords in a second database to generate a final matching result.

A system for handling multimedia using entity and relation objects is described in U.S. Pat. No. 5,278,946, Shimada et al. issued on Jan. 11, 1994. An entity object defines methods and properties for entities such as a building, road, railroad, and boundary. A relation object defines method and properties for relationships between entities. A user model and system model can be coupled to generate a digest of multimedia data.

A system for storing and retrieving digital images is described in U.S. Pat. No. 5,493,677, Balogh et al., issued on Feb. 20, 1996. A caption or other metadata can be associated with a digital image. A natural language capability removes ambiguities from the metadata input by a user prior to its storage. The natural language capability determines matches between a user query and the stored metadata. The system allows a user to select an image, review licensing terms for the selected image, and order the image.

A repetitive analysis event system that accesses data using a time-based number is described in U.S. Pat. No. 5,414,644, Seaman et al., issued on May 9, 1995. The system uses an information library that consists of visual data storage and a textual database for storing written descriptions of the visual data and a glossary of keywords that identify repetitive events or behavior. A behavioral label is used to define a behavioral activity. A series of images or video clips are associated with the behavioral label. A user can retrieve images by identifying a subject, a behavioral activity, or other type of descriptive text. A chronological timeline is used to control the order in which the images are displayed. That is, the images are displayed in sequential order using the time-based number.

A knowledge based information retrieval system is described in U.S. Pat. No. 5,404,506, Fujisawa et al., issued on Apr. 4, 1995. The system provides a visual interface for local searching and a natural language interpreter for global search. The natural language interpreter is used to infer the meaning of a noun phrase or a nominal phrase. The inferred meaning is used to retrieve information.

The search capabilities in the patents identified above do not provide an ability to catalogue multimedia data such that it is available for use across systems or applications. There is no ability to create a general catalogue and index for searching a catalogue that can be used for the storage and retrieval of multimedia data by multiple applications. The storage approach used in the prior art is designed to accommodate a particular system's needs. A number of other approaches are described, but in these too, the index capabilities are designed for use with a particular system.

An indexing capability designed for use with a hypertext nodal network is described in U.S. Pat. No. 5,408,655, Oren et al., issued on Apr. 18, 1995. The set of indexing terms generated using the hypertext nodal network are compared with each of the nodes in the database to identify a set of index terms for each node (i.e., document index terms). A set of index terms are associated with an option or criterion (i.e., option index terms) that can be user-selected from a menu. A hypertext nodal network is needed to use the indexing capability in this case.

An index is described in U.S. Pat. No. 5,121,470, Trautman, issued on Jun. 9, 1992 describes an interactive record system that automatically indexes data obtained from multiple sources. The invention has application in the medical care field. The data is indexed along one or more dimensions (e.g., time). Data events are identified for the indexed data by distinguishing sets of data into given intervals. Data objects are associated with the data events.

The events and associated data objects are displayed. Actuators are associated with the data objects to allow the objects to be manipulated. Data events and dimensional criteria is needed to use this indexing scheme.

A system for identifying and displaying an image that is selected based on user input is described in U.S. Pat. No. 5,010,500, Makkuni et al., issued on Apr. 23, 1991. Gestures input using a mouse are used to identify an image having features that resemble the input. Multimedia data associated with a portion of the image can be activated by selecting the image portion. When a selection is made, a menu can be displayed for user selection. Data is indexed based on actual portions of images.

A system that creates an index for frame sequences in a motion image is described in U.S. Pat. No. 5,428,774, Takahashi et al., issued on Jun. 27, 1995. Each record in the index has an associated retrieval key. The initial and final positions of a frame sequence are designated in an index record. Records are retrieved from the index file based on the retrieval key. The retrieved records are arranged along a time axis based on the initial and final positions. Data (i.e., frame sequences of a motion picture) is indexed based on a time sequence of frames of the data.

A system that uses keywords to locate and retrieve higher level records is described in Kuga et al., U.S. Pat. No. 5,280,573, issued on Jan. 18, 1994. Each of a plurality of higher level records contain different types of information associated with a keyword. Such higher level records may contain usage, synonym, and meaning information associated with a keyword, for example.

A system for storing images and audio that can be used to create an audio-visual presentation is described in Beitel et al., U.S. Pat. Nos. 5,119,474 and 5,274,758, issued on Jun. 2, 1992 and Dec. 28, 1993, respectively. The system includes the following software components: library editor; image editor; digitize editor; convert editor; audio editor, and story editor. The image editor can edit an image (i.e., add text and graphics to an image). The digitize and audio editors convert analog data to digital data. The convert editor is used to convert images to a form that is usable by the system. Images and audio data are assembled into a presentation using the story editor. The library editor manages the storage, retrieval and processing of system objects (an object is an image, audio file or audio/visual presentation). The library editor maintains a library of files that contain an object.

SUMMARY OF THE INVENTION

The invention catalogues data such as multimedia data. A catalogue is a collection of one or more catalogue elements. An index is used to access a catalogue. An element of a catalogue has one or more attributes. An attribute provides information that can be used to search for, answer questions about, and navigate through a catalogue. An attribute of a catalogue element can be an element that has attributes. A catalogue element attribute that is an element is referred to as an attribute element. Attribute elements and attributes are used to build an index that can be used to facilitate catalogue access. Within a catalogue, smaller catalogues can be created by, for example, querying and user designation.

An analogy can be drawn between the multimedia catalogue of the invention and a card catalogue in a library. The card catalogue contains a single catalogue element (i.e., a card). The card catalogue is comprised of a plurality of catalogue element instances (i.e., a plurality of cards). Each card is associated with a book or some other material contained in the library. A card contains information or attributes (e.g., author, title, numbering system). The attributes are used to build an indexing system (e.g., numbering system) that can be used to facilitate a search through the catalogue. The card contains information or attributes that can be used to satisfy a query operation (e.g., select a card from the card catalogue) performed on the card catalogue.

The multimedia data catalogue used in the invention preferably consists of one catalogue element that is referred to as a phrase. A phrase is associated with a portion of multimedia data. A phrase has a plurality of attributes some of which are attribute elements. The attribute elements that are attributes of a phrase include keyword, person, image, video (e.g., documentary footage), proposed person, and proposed keyword. The keyword, person, image, proposed person and proposed keyword attribute elements can have attributes that are also attribute elements. For example, attribute elements that are attributes of the keyword attribute element include thesaural keyword, thesaural person, keyword, and type. An index is built on the attributes and attribute elements. The index can be used to navigate through the catalogue (e.g., search for phrases).

A set of catalogue elements can be identified by querying the attribute elements. A query operation can be performed on the attribute elements to examine other attribute elements associated with a catalogue element. A query operation identifies a set of cataloguing elements (e.g., phrases) that satisfy the criteria specified in the query. A set of cataloguing elements identified in a query are grouped as a segment. A segment is a container element that contains a collection of phrases. A user can also specify a collection of phrases that can be grouped as a segment. Segments can contain other groupings of phrases (e.g., phrases associated with a related input data portions). A segment can have their own attributes and attribute elements.

In addition to the catalogue and attribute elements, the invention associates a plurality of event elements with the input data. An event element is associated with an input data portion. An event element is a quality assurance event, for example, that marks an input data portion that has relevance to quality assurance data collection. Quality assurance events can be identified as a positive, negative, or informational event. A quality assurance event can also identify a fact or piece of information. An event element can also be associated with other elements such as a catalogue element (e.g., phrase) or a container element (e.g., segment).

Catalogue, attribute and event elements are instantiated and maintained using cataloguing and relationship management facilities. The cataloguing and relationship management facilities are provided to accept user input and generate elements and their attributes. The collection of element instances created using the cataloguing and relationship management facilities can be used as an interface by any system to access input data.

One attribute of a phrase element is referred to as a descriptive phrase. A user enters a descriptive phrase associated with an instance of the phrase element using the cataloguing facility interface. The cataloguing facility parses the descriptive phrase to identify existing attribute elements to associate with the phrase element. In addition, the descriptive phrase can be used to identify potential or proposed attribute elements such as proposed person and proposed keyword. Proposed attribute elements can also be entered by a user. A proposed attribute element is approved prior to its use as an actual attribute element.

The thesaural keyword and thesaural person attribute elements are examples of attribute elements that contain alternate information. Thesaural keyword and person attribute elements contain alternate information for the keyword and person attributes elements, respectively. For example, a keyword attribute element has a plurality of associated labels or values. A label associated with a keyword attribute element is supplied by a thesaural keyword attribute element. Thus, a thesaural keyword attribute element is an instantiation of a keyword attribute element.

Thesaural keyword attribute elements can further be used to supply a label in one or more languages for a keyword attribute element. That is, a keyword attribute element can have a plurality of labels in a plurality of languages. For example, a keyword attribute element can be associated with a plurality of thesaural keyword attribute elements each having a label, or value, represented in a language (e.g., English, French, German, and Russian). Each keyword attribute element having a plurality of labels in a language can have a preferred label in that language. Thus, a thesaural keyword attribute element can be an instantiation of a language thesaural keyword attribute element.

A type attribute element is used to classify keyword attribute elements. A type is associated with a keyword attribute element to classify the keyword attribute element. A hierarchy of type attribute elements can be used to classify instances of the type attribute element and their associated keyword attribute element instances. Similarly, a keyword attribute element is used to classify a thesaural keyword attribute element. A thesaural keyword attribute element is used to classify a language thesaural keyword attribute element.

Relationships can exist between two elements. A relationship can be "is_a", whole/part, or association. An "is_a" relationship establishes an inheritance relationship between two or more elements. A whole/part relationship identifies the elements that are contained within another element. An association relationship is used to relate one element to another element.

The catalogue element(s) and associated attributes and attribute elements can be used to catalogue different sets of multimedia data. Further, within a catalogue, alternate expressions of content can be achieved using thesaural keywords and alternate thesauruses. Thus, the nature of the catalogue associated with multimedia data can be varied within a thesaurus (using thesaural keyword instances) or by using multiple thesauruses.

A phrase element has one or more associated keywords that identify content. Each keyword has one or more associated instances of thesaural keyword. Each thesaural keyword instance contains an alternate expression of content for its associated keyword. Thus, alternative content specifications can be created using alternative instances of thesaural keyword.

In addition, content associated with a catalogue can be varied using multiple thesauruses for a catalogue. A thesaurus can be defined using the keyword and type hierarchies formed from instances of keyword and type attribute elements. Each thesaurus can contain an alternative specification of content for a catalogue. That is, each thesaurus can contain instances of keyword and type attribute elements having an alternate content or concept. specification. Thus, content associated with a catalogue can vary with each instance of a thesaurus.

DETAILED DESCRIPTION OF THE INVENTION

A method and apparatus for cataloguing multimedia is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
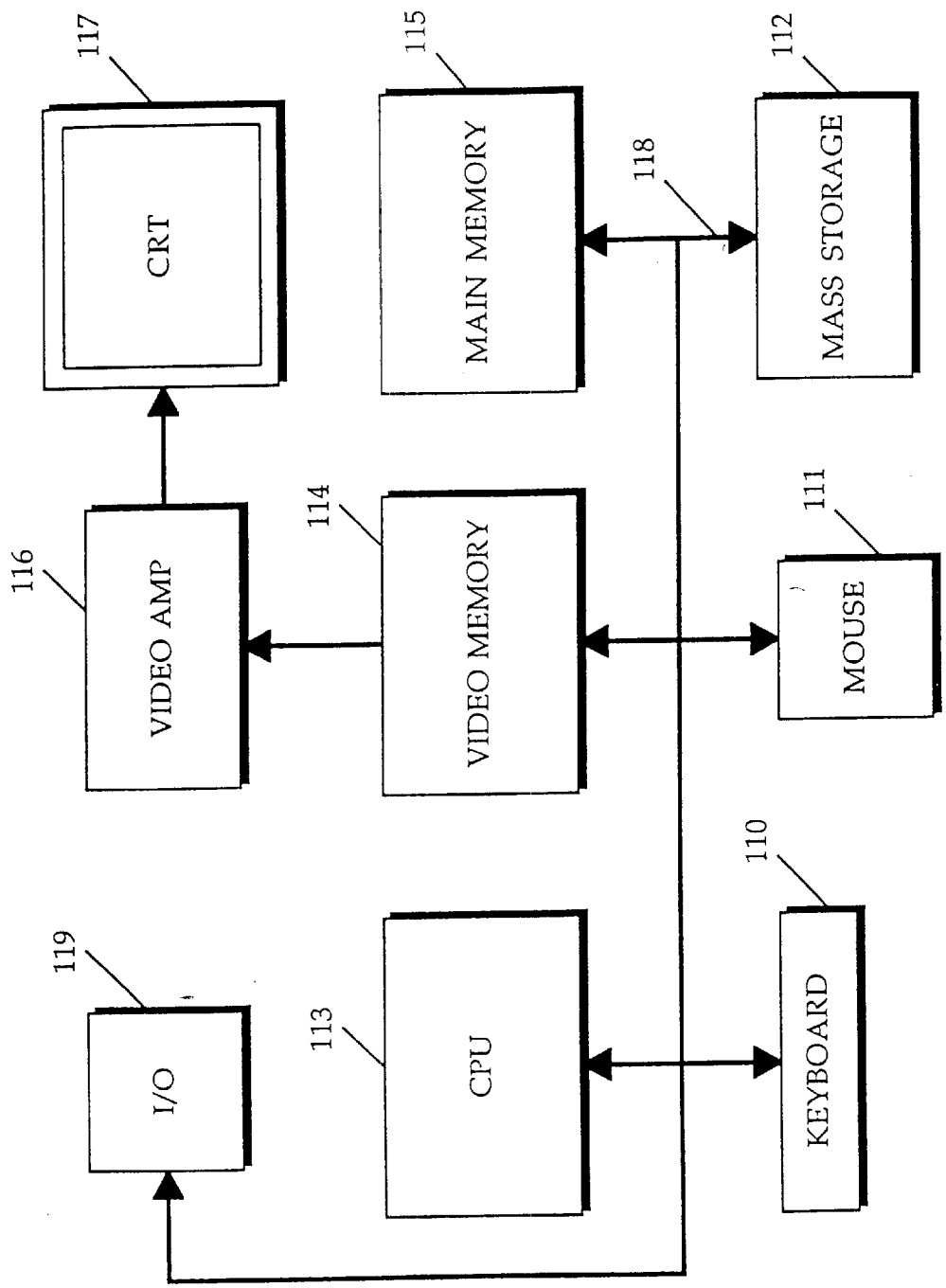
FIG. 1 provides an example of a general purpose computer to be used with the present invention.

An embodiment of the invention can be implemented as computer software in the form of computer readable program code executed on a general purpose computer such as illustrated in FIG. 1. A keyboard 110 and mouse 111 are coupled to a bi-directional system bus 118. The keyboard and mouse are for introducing user input to the computer system and communicating that user input to central processing unit (CPU) 113. Other suitable input devices may be used in addition to, or in place of, the mouse 111 and keyboard 110. I/O (input/output) unit 119 coupled to bi-directional system bus 118 represents such I/O elements as a printer, network communications card, modem, A/V, (audio/video) I/O, etc.

The computer system of FIG. 1 also includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as CPU 113, main memory 115, video memory 114 and mass storage 112. Alternatively, multiplex data/address lines may be used instead of separate data and address lines.

In one embodiment of the invention, the CPU 113 is a microprocessor manufactured by Motorola, such as the 680X0 processor or a microprocessor manufactured by Intel, such as the 80X86, or Pentium processor, or a SPARC microprocessor from Sun Microsystems. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

The computer system described above is for purposes of example only. An embodiment of the invention may be implemented in any type of computer system or programming or processing environment. When a general purpose computer system such as the one described executes the processes and process flows described herein, it is a means for cataloguing multimedia data according to one or more embodiments of the invention.

Creating a Catalogue

The invention catalogues data such as multimedia data. A catalogue is a collection of one or more catalogue elements. An index is used to access a catalogue. An element of a catalogue has one or more attributes. An attribute provides information that can be used to search for, answer questions about, and navigate through a catalogue. An attribute of a catalogue element can be an element that has attributes. A catalogue element attribute that is an element is referred to as an attribute element. Attribute elements and attributes are used to build an index that can be used to facilitate catalogue access. Within a catalogue, smaller catalogues can be created by, for example, querying and user designation.

Catalogue and Attribute Elements

The multimedia data catalogue used in the invention preferably consists of one catalogue element that is referred to as a phrase. A phrase is associated with a portion of multimedia data. A phrase has a plurality of attributes some of which are attribute elements. The attribute elements that are attributes of a phrase include keyword, person, image, video (e.g., documentary footage), proposed person, and proposed keyword. The keyword, person, image, proposed person and proposed keyword attribute elements can have attributes that are also attribute elements. For example, attribute elements that are attributes of the keyword attribute element include thesaural keyword, thesaural person, keyword, and type. An index is built on the attributes and attribute elements. The index can be used to navigate through the catalogue (e.g., search for phrases).

Figure 2A:
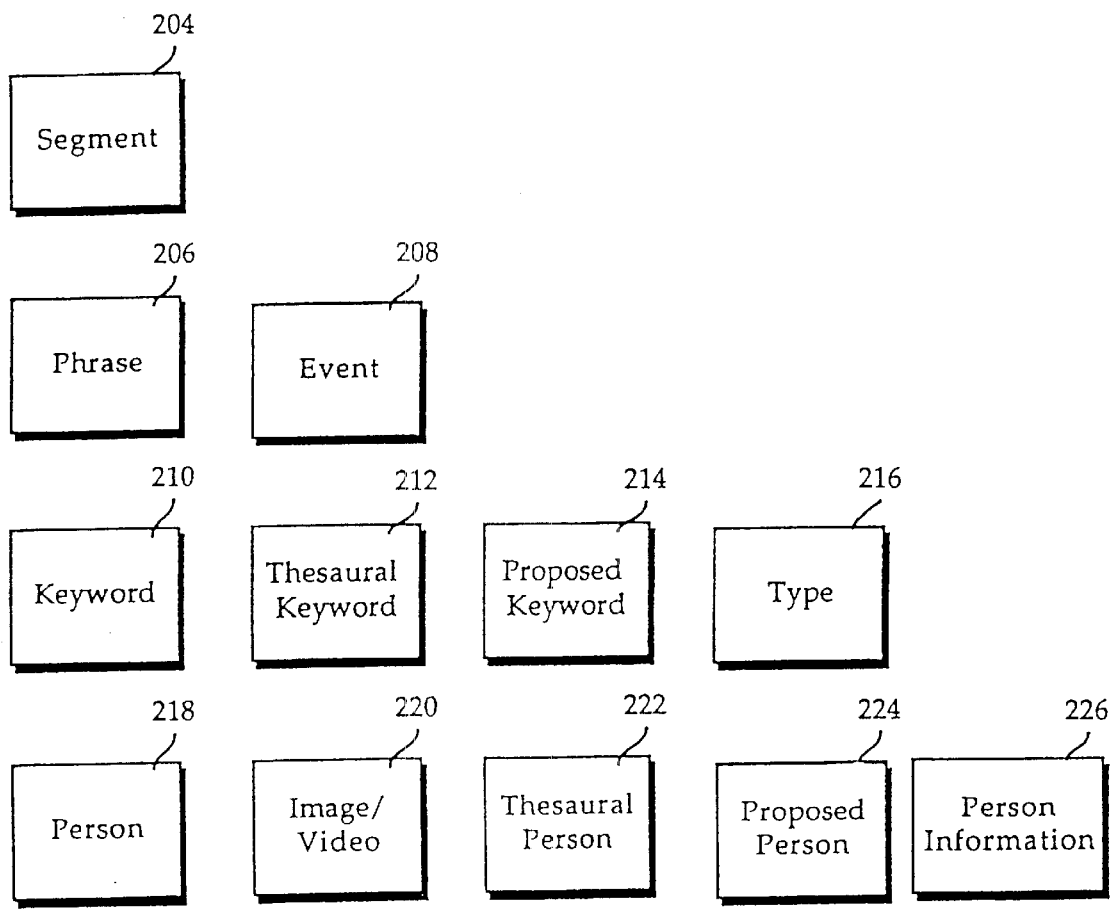
FIG. 2A provides an example of catalogue and attribute elements according to an embodiment of the invention.

FIG. 2A provides an example of catalogue and attribute elements according to an embodiment of the invention. Segment 204 is a container element. It can contain other elements. For example, segment 204 can contain one or more instances of phrase 206. In the invention, input data is decomposed into one or more pieces, or fragments. An instance of phrase 206 is associated with each input data fragment. Phrase 206 is a catalogue element. Phrase 206 has one or more attributes and/or attribute elements on which an index is built. The index can be used to navigate through the catalogue.

An attribute of phrase 206 is keyword 210. An instance of phrase 206 can be associated with one or more instances of keyword 210. Keyword 210 further defines aspects of an input data fragment. Preferably, an attribute of keyword 210 identifies content, or substance, for an input data fragment. The content or substance identified by keyword 210 is preferably expressed as a single word. However, content or substance can be expressed using multiple words.

To illustrate, the input data can be a videotape. The videotape is, for example, that of an interview conducted with a survivor of the Holocaust. The interview is broken down into the interviewee's pre-war, war-time, and post-war experiences. The interviewee's pre-war experience can be broken down into topics. A pre-war topic might be the interviewee's personal life, for example. Each topic can be broken down into sub-topics. In the example of the interviewee's personal life, a sub-topic might be the interviewee's relationship with family members, experiences at school, etc. Each sub-topic contains an information item. To further illustrate using the current example, an information item might be home, brother, sister, teacher, etc. In this example, the topic of the interviewee's personal life becomes an instance of segment 204. The interviewee's relationship with family members and experiences at school become instances of phrase 206. The words home, brother, sister, and teacher become instances of keyword 210. The words home, brother, sister and teacher provide information regarding the content or substance of an input data fragment.

An instance of keyword 210 can be associated with one or more instances of thesaural keyword 212. An instance of thesaural keyword 212 is an instantiation of an instance of keyword 210. Thesaural keyword 212 specifies a value or label for its associated instance of keyword 210. Thesaural keyword 212 can be one or more words. Thesaural keyword 212 can be used, for example, to specify a value for an instance of keyword 210 in a particular language. Multiple instances of thesaural keyword 212 can be used to express the value of an instance of keyword 210 in multiple languages. Alternative expressions for the value of an instance of keyword 210 can be retained by instances of thesaural keyword 212 as well. Thus, the content or substance of an input data fragment can be expressed in multiple languages with a plurality of alternative expressions in each language. A preference can be associated with an instance of thesaural keyword 212 to identify it as a preferred alternative in a given language.

Figure 2B:
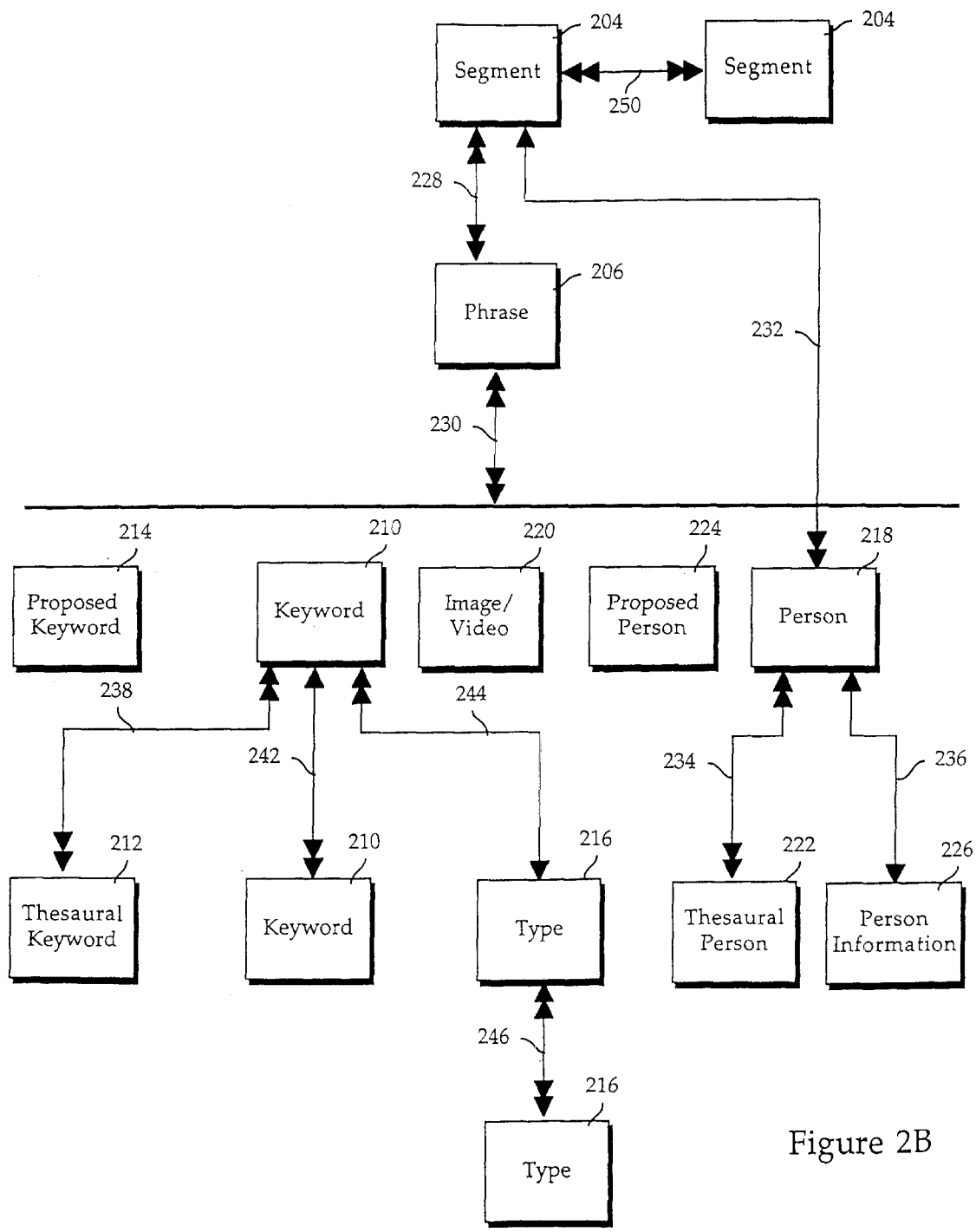
FIG. 2B illustrates relationships formed between the elements identified in FIG. 2A according to an embodiment of the invention.
Figure 2C:
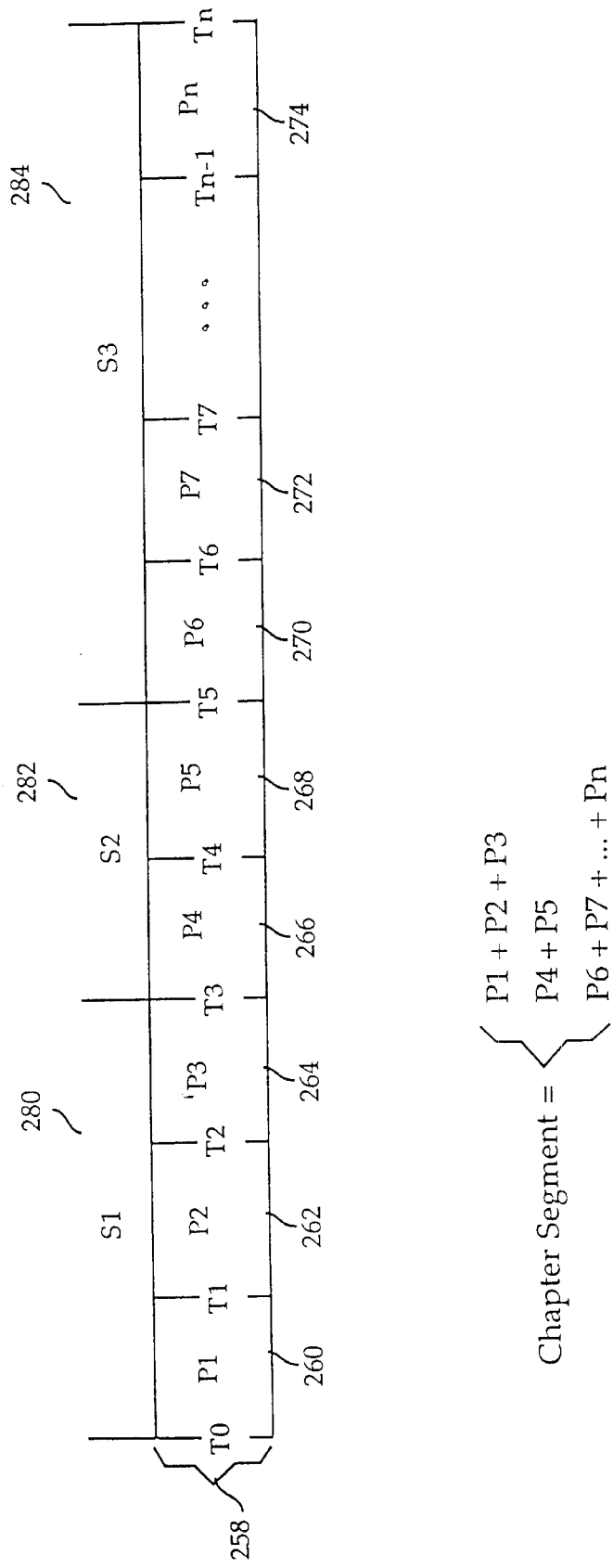
FIG. 2C provides examples of instances of segment 204 according to an embodiment of the invention.
Figure 2D:
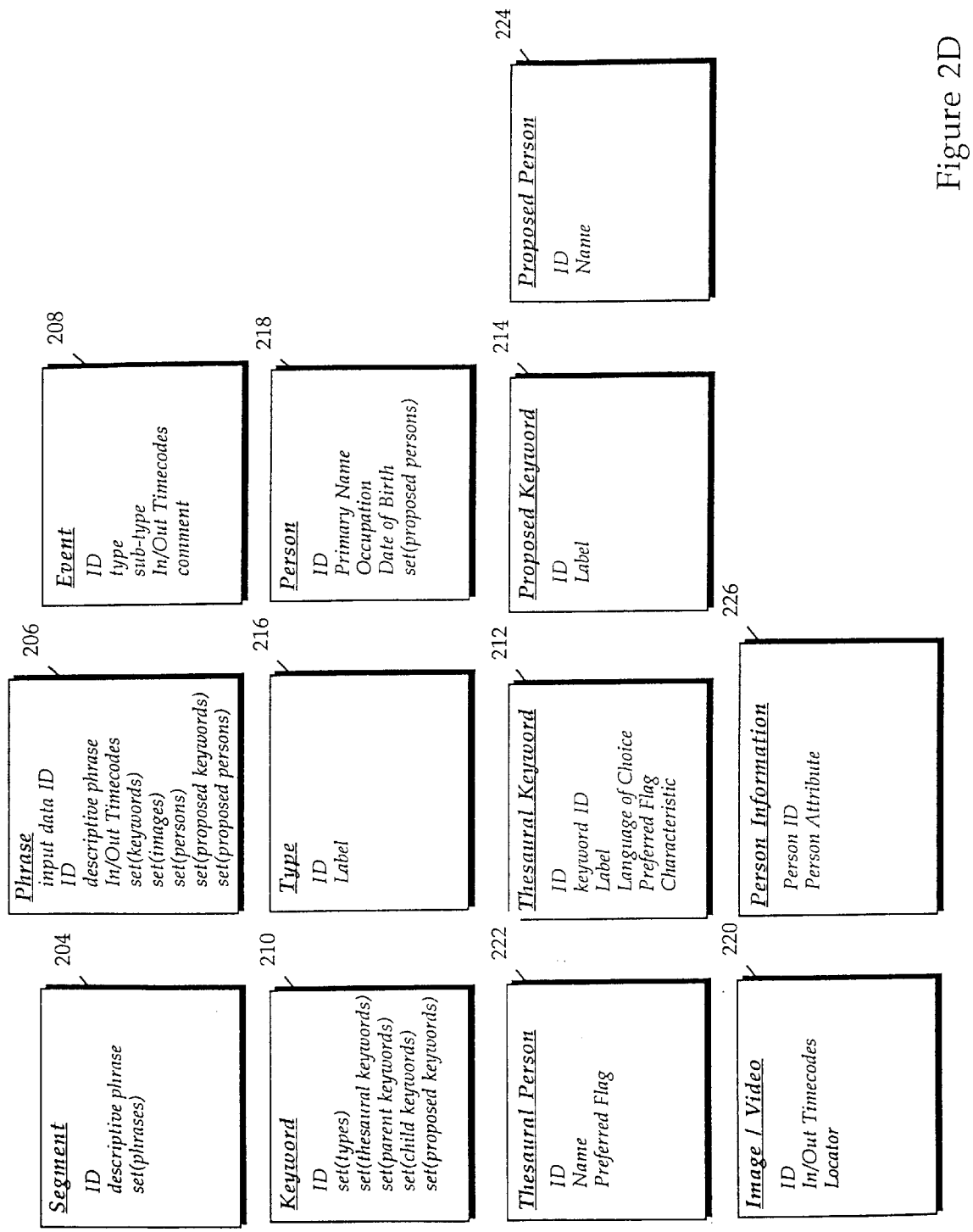
FIG. 2D provides examples of attributes for catalogue and attribute elements according to an embodiment of the invention.
Figure 2E:
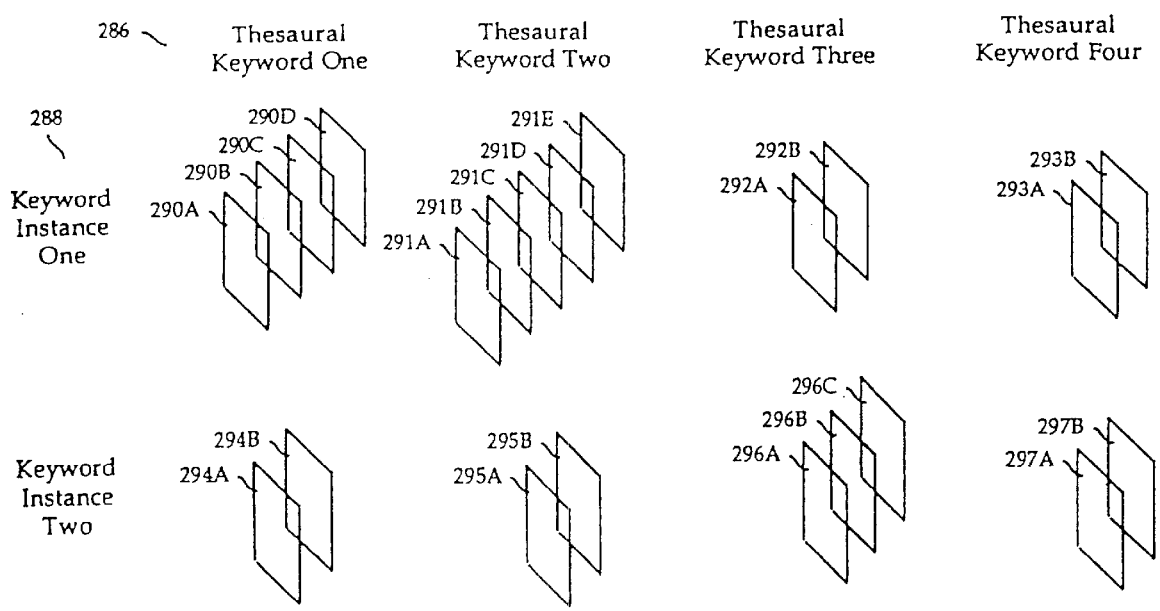
FIG. 2E provides an illustration of instances of keyword 210 and a plurality of associated label attributes according to an embodiment of the invention.

FIG. 2E provides an illustration of instances of keyword 210 and a plurality of associated label attributes according to an embodiment of the invention. A grid is displayed with axes 286 and 288. Instances of keyword 210 are displayed along a vertical axis, axis 286. A horizontal axis, axis 286 contains examples of languages in which a label associated to an instance of keyword 210 can be represented. Instances of thesaural keyword 212 are depicted at the intersections of these two axes.

Each instance of thesaural keyword 212 is an instantiation for an associated instance of keyword 210. Each instance of thesaural keyword 212 contains a label that can be used as the label for an instance of keyword 210. For example, thesaural keywords 290A–290D, 291A–291E, 292A–292B, and 293A–293B are instantiations of Keyword Instance One. Similarly, thesaural keywords 294A–294B, 295A–295B, 296A–296C, 297A–297B are instantiations of Keyword Instance Two.

An instance of thesaural keyword 212 can be an instantiation of an instance of keyword 210 in a particular language. For example, thesaural keywords 291A–291E are English instantiations of Keyword Instance One. Thesaural keywords 291A–291E provide alternate instantiations for Keyword Instance One. That is, each contains a English-language label for Keyword Instance One. Thus, Keyword Instance One can be associated with a different English-language label based on which instance of thesaural keywords 291A–291E is used to supply the label for Keyword Instance One. Similarly, Keyword Instance is associated with English-language alternatives contained in thesaural keywords 295A–295B.

Thus, within a language, an instance of keyword 210 can have alternate instantiations of thesaural keyword 212. An instance of keyword 210 can also have alternate instantiations of thesaural keyword 212 across multiple languages as exemplified in FIG. 2E. Alternate instantiations for Keyword Instance One exist in French (e.g., thesaural keywords 290A–290D), German (e.g., thesaural keywords 292A–292B), and Russian (e.g., thesaural keywords 293A–293B), for example. Similarly, Keyword Instance Two has alternative instantiations in French (e.g., thesaural keywords 294A–294B), German (e.g., thesaural keywords 294A–294C), Russian (e.g., thesaural keywords 297A–297B).

A preferred alternate instantiation of an instance of keyword 210 can be identified in each of the languages in which the keyword instance is represented. Thus, for example, thesaural keyword instance 290C can be identified as the preferred instantiation of Keyword Instance One for the French language. Similarly, thesaural keyword instances 291B, 292A, and 293B can be the preferred English, German, and Russian (respectively) instantiations for Keyword Instance One. Thesaural keyword instances 294A, 295B, 296C, and 297A can be the preferred French, English, German, and Russian instances (respectively) for Keyword Instance Two.

Referring to FIG. 2A, type 216 is associated with keyword 210. Type 216 provides attribute information for keyword 210. Type 216 can be used to include instances of keyword 210 in a classification or category. In other words, an instance of keyword 210 is an instantiation of an instance of type 216. For example, an instance of keyword 210 having an attribute of "Ford Bronco" could be associated with a type instance having an attribute of "car". Another instance of keyword 210 having an attribute of "Mustang" can also be associated with the same instance of type 216. Both instances of keyword 210 are instances of a car. One or more instances of type 216 can be associated with an instance of keyword 210. In the preferred embodiment, a hierarchy is established for instances of type 216. An instance of type 216 can be a parent to or a child of another other instances of type 216. An instance of keyword 219 that is associated with an instance of type 216 is also associated with the hierarchy of the instance of type 216.

Other attribute elements that can be associated with an input data fragment via phrase 206 include person 218, and image 220. Person 218 identifies an individual associated with an input data fragment. In the previous example, a personal life experience may contain a reference to a person. An instance of person 218 can be used to identify the reference. Person information 226 provides attribute information for an instance of person 218. An instance of image 220 is used for data such as a still photograph that is referenced in the input data.

In the preferred embodiment of the invention, some elements, such as keyword 210 and person 218, must be approved before becoming actual instances. Prior to approval, the instances are considered to be proposed instances. For example, proposed keyword 214 and proposed person 224 are attribute elements used to identify instances of keyword 210 and person 218 that have not yet been approved as actual instances. Proposed instances are reviewed and a determination is made whether to transform the proposed attribute element into an actual attribute element or to otherwise dispose of the proposed attribute element.

Person Information 226 is an attribute element associated with person 218. A "one-to-one" relationship (relationship 236) exists between person information 226 and person 218. Person information 226 contains attributes for person 218. The attributes of person information 226 contain information for a person having an instance of person 218.

Events can also be associated with input data. Each event becomes an instance of event 208. As previously described, input data can be decomposed into input data fragments each of which is associated with an instance of phrase 206. Input data can also be decomposed into input data fragments that are associated with instances of event 208. A type attribute is associated with event 208. Examples of an event type in the preferred embodiment include a segment, phrase, break between tapes, quality assurance details, facts, and miscellaneous (or other). An event can be used to access the associated input data fragment. An instance of event 208 can be used to access an input data fragment. For example, an instance of event 208 of type phrase can be used to locate the input data fragment associated with an instance of phrase 206.

Another example of an event type is a quality assurance event. In the preferred embodiment of the invention, a quality assurance mechanism can be used to monitor the quality of the input data and provide feedback. Quality assurance events are used to mark the input data. An event can mark a positive, negative, or neutral quality assurance event. For example, video input data is being collected in multiple interviews. Each interview can be reviewed to identify parts of the interview process that are noteworthy. Where, for example, an interviewer does not follow-up with an interviewee to obtain additional details, a negative quality assurance event can be created. A positive event can be similarly created. An event that is neither positive nor negative (i.e., informational or neutral) can also be created. A report of quality assurance events can be generated and used to provide feedback to the persons involved in collecting the input data.

Relationships of Elements

In the preferred embodiment, catalogue and attribute elements are interrelated. Relationships are formed between two or more elements using the invention. FIG. 2B illustrates relationships formed between the elements identified in FIG. 2A according to an embodiment of the invention. A "many" relationship is signified using a double arrow. A "one" relationship is identified using a single arrow. Relationship 228, for example, is a "many-to-many" relationship. That is, one or more instances of segment 204 can be related to many instances of phrase 206. Alternatively stated, segment 204 contains one or more instances of phrase 206. One instance of phrase 206 can be related to multiple instances of segment 204. That is, an instance of phrase 206 is contained within one or more instances of segment 204. As illustrated by relationship 246, one or more instances of type 216 can be related to other instances of type 216.

A "many-to-many" relationship (relationship 230) exists between phrase 206 and proposed keyword 214, keyword 210, image/video 220, proposed person 224 and person 218. An instance of phrase 206 can be related to a set of proposed keywords, a set of keywords, a set of images and/or video, a set of proposed persons, and a set of persons, each set having zero or more members. Further, an instance of proposed keyword 214, keyword 210, image 220, proposed person 224 or person 218 can be related to more than one instance of phrase 206.

Relationship 238 illustrates a "many-to-many" relationship between keyword 210 and thesaural keyword 212. An instance of keyword 210 can be associated with one or more instances of thesaural keyword 212. The same instance of thesaural keyword 212 can be associated with one or more instances of keyword 210.

As previously stated, instances of type 216 can be interrelated with other instances of type 216 via a type hierarchy. Relationship 244 identifies an instance of type 216 as a parent or child of another instance of type 216. Similarly, the instances of keyword 210 are interrelated via a keyword hierarchy. Keyword 210 can be related to other instances of keyword 210 via relationship 242. Relationship 242 identifies an instance of keyword 210 as a parent or child of another instance of keyword 210. Relationship 244 relates keyword 210 and type 216. That is, one instance of keyword 210 is related to an instance of type 216. Conversely, an instance of type 216 can be associated with multiple instances of keyword 210.

Further, an instance of keyword 210 can be related to many instances of type 216 via relationships 242 and 246. That is, an instance of keyword 210 has a type that is associated with an instance of type 216. In addition, the instance of keyword 210 inherits the types associated with the children of its associated instance of type 216.

Person 218 and person information 226 have a "one-to-one" relationship via relationship 228. Person 218 and thesaural person 222 are related via relationship 234. Person 218 can be associated with multiple instances of thesaural person 222. An instance of thesaural person 222 can be related to multiple instances of person 218 via relationship 234.

Segment 204 is a container element. That is, as illustrated by relationship 228, segment 204 can contain multiple instances of phrase 206. Segment 204 is defined by the set of elements that it contains. For example, segment 204 is, for example, a chapter segment, a testimony segment, or a general segment. Instances of phrase 206 can be grouped in the order in which they occur in the input data in a chapter segment. As a testimony segment, segment 204 contains a grouping of instances of 204 associated with the input data. For example, a testimony segment can contain all instances of segment 204 that are associated with a videotaped interview. Person 218 can be related to segment 204 via relationship 232. At least one instance of person 218 is related to an instance of segment 204 that is a testimony segment via relationship 232.

Relationship 250 illustrates the relationship between instances of segment 204 (i.e., a testimony segment) that act as a container for other instances of segment 204. A general segment contains a set of instances of phrase 206 that are not necessarily related to particular input data. A general segment can be a collection of phrases that meet a certain criteria. For example, a general segment can contain instances of phrase 206 that are related to an instance of keyword 210 having a value of "teacher".

Segment 204 therefore identifies a group of catalogue elements (e.g., phrase 206. An instance of segment 204 can identify all catalogue element instances. Other instances of segment 204 can identify a subset of catalogue elements. Thus, for example, an instance of segment 204 can identify all instances of phrase 206 or a some subset of all of the instances of phrase 206. The set including all instances of phrase 206 is a catalogue. A smaller catalogues that contain a subset of all instances of phrase 206 is also a catalogue. Within a catalogue, a smaller catalogue can be created by, for example, a query operation or user designation.

A set of catalogue elements can be identified by querying the attribute elements, for example. A query operation can be performed on the attribute elements to examine other attribute elements associated with a catalogue element. A query operation identifies a set of cataloguing elements (e.g., instances of phrase 206) that satisfy the criteria specified in the query. A set of cataloguing elements identified in a query are grouped in an instance of segment 204. A user can also specify a collection of phrases 206 that can be grouped in an instance of segment 204.

FIG. 2C provides examples of instances of segment 204 according to an embodiment of the invention. Referring to FIG. 2C, input data 258 is comprised of multiple input data fragments. Input data fragment 260 starts at time $T_0$ and ends at time $T_1$. Phrase $P_1$ is associated with input data fragment 260. Similarly, input data fragments 262, 264, 266, 268, 270, 272, and 274 are associated with phrases $P_2$, $P_3$, $P_4$, $P_5$, $P_6$, $P_7$, and $P_n$.

Segment 280 (i.e., $S_1$) comprises phrases $P_1$, $P_2$, and $P_3$. Segment 282 (i.e., $S_2$) comprises phrases $P_4$ and $P_5$. Segment 284 (i.e., $S_3$) comprises phrases $P_6$, $P_7$, through $P_n$. Segments $S_1$, $S_2$, and $S_3$ (i.e., 280, 282, and 284, respectively) are chapter segments. The collection of the chapter segments associated with input data 258 (i.e., $S_1$, $S_2$, and $S_3$) comprise a testimony segment. A general segment can contain any collection of phrases such as $P_1$, $P_4$, $P_5$, $P_6$ and $P_n$.

Attributes

FIG. 2D provides examples of attributes for catalogue and attribute elements according to an embodiment of the invention. Segment 204 contains an identifier (ID), a descriptive phrase, and a set of phrases, for example. The phrases related to an instance of segment 204 are included in the segment instance's set of phrases. A set is formed by creating relationships between the elements. FIG. 2B illustrates examples of the relationships that exist between elements in an embodiment of the invention. The relationships that form a set can be implemented using any of the known techniques known in the art. For example, the relationships can be implemented in a programming language using pointers. In a relational database management system, for example, the relationships can be formed using relations and primary and foreign keys.

Referring to FIG. 2D, phrase 206 includes an input data ID (e.g., identifies the input data from which the phrase was generated), an ID, a descriptive phrase, In/Out timecodes (i.e., a corresponding location within the input data), a set of keywords, images, persons, proposed keywords, and proposed persons. Keyword 210 includes an ID, and sets of types, thesaural keywords, child keywords and parent keywords. The child and parent keyword set form relationships for the keyword hierarchy. The set of thesaural keywords related to keyword 210 contain keyword values or labels for keyword instance.

Person 218 includes an ID, a primary name, an occupation, date of birth, and a set of proposed persons. Person information 226 contains a person ID for the associated instance of person 218. Person information 226 contains one or more attributes for the associated instance of person 218. The attribute information can vary depending on the multimedia information being catalogued. For example, the catalogued multimedia data may consist of interviews with individuals. An instance of person 218 can be instantiated and associated with an interviewee. Person information 226 associated with the instance of person 218 can then include biographical information of the interviewee. The multimedia data videotaped sporting events. In this case, an instance of person 218 can be created for a person associated with the sporting event (e.g., player, referee, and broadcasting personnel). An instance of person information 226 associated with the instance of person 218 can include statistical information associated with the participant.

An event 208 includes an ID, type (e.g., segment, phrase, interviewer, videographer, fact, or other), sub-type (e.g., a positive, negative, or informational event), timecodes, and a comment (or descriptive note).

Thesaural keyword 212 includes an ID, a keyword ID (i.e., the ID for an instance of keyword 210 for which the thesaural keyword instance is an alternative), a label (i.e., the value of the keyword instance to which the thesaural instance is related), a language of choice identifier (or language ID), a preferred flag, and a characteristic (or class). If set, the preferred flag specifies that the thesaural keyword instance is the preferred alternative for the related keyword instance in the language specified by the language ID. The characteristic attribute further defines the thesaural keyword instance. It can be used to identify that thesaural keyword instance is a slang word, for example.

An ID, timecode and locator are included as attributes for image 220. The locator attribute is used to locate the digitized image, for example. Proposed keyword 214 includes an ID and a label. It is also possible to include the attributes contained in keyword 210 in proposed keyword 214. Thus, the user that is proposing a new keyword can enter as much information regarding the proposed keyword. Proposed person 224 includes an ID and name attribute. Like proposed keyword 214, the attributes associated with person 218 can be included in proposed person 224. Type 216 includes an ID and a label.

Elements and their relationships can be managed using a cataloguing mechanism and a relationship management mechanism. The cataloguing mechanism includes a user interface that includes a series of screens. During cataloguing, a user (e.g., a cataloguer) reviews the input data and causes elements to be instantiated and associated with the input data and other elements. Elements that already exist can be associated with the input data during cataloguing. In addition, a cataloguer can propose new elements and relationships. The relationship management facility is used to review the elements and relationships proposed by a cataloguer. The relationship management facility can also be used to create new elements and relationships.

Cataloguing Facility

The cataloguing facility includes a user interface that comprises a series of screens. The cataloguing facility also includes processes for processing input to the user interface.

Catalogue User Interface

FIGS. 3A–3F illustrate a cataloguing facility user interface screen for reviewing input data and associating the input data with catalogue and attribute elements and identifying element attributes according to an embodiment of the invention.

Screen 302 of the cataloguing interface (see FIG. 3A) is comprised of multiple areas. Area 310 is used for viewing the input data. In the preferred embodiment, the input data is video data. However, it should be apparent that the invention can be used for any type of data. FIG. 3C provides a detailed example of input data viewing area 310 of FIG. 3A. Area 310 is comprised of area 340 wherein the video data is replayed much like it is played on a television screen. Area 342 provides control buttons to manipulate the input data (e.g., play, pause, fast forward, fast reverse, etc.) Button 344 allows the cataloguer to create an instance of image 220 (e.g., a timecode, descriptive note, and locator can be associated with the input data currently being viewed in viewing area 340. Button 346 moves the video input being displayed in area 340 to the beginning of a specified instance of phrase 206. When button 346 is pressed, a timecode associated with the previous instance of phrase 206 is used to access the location of the previous instance in the input data. Button 348 moves the video to the end of the previous phrase. Other controls can be used to move through the input data.

Figure 3A:
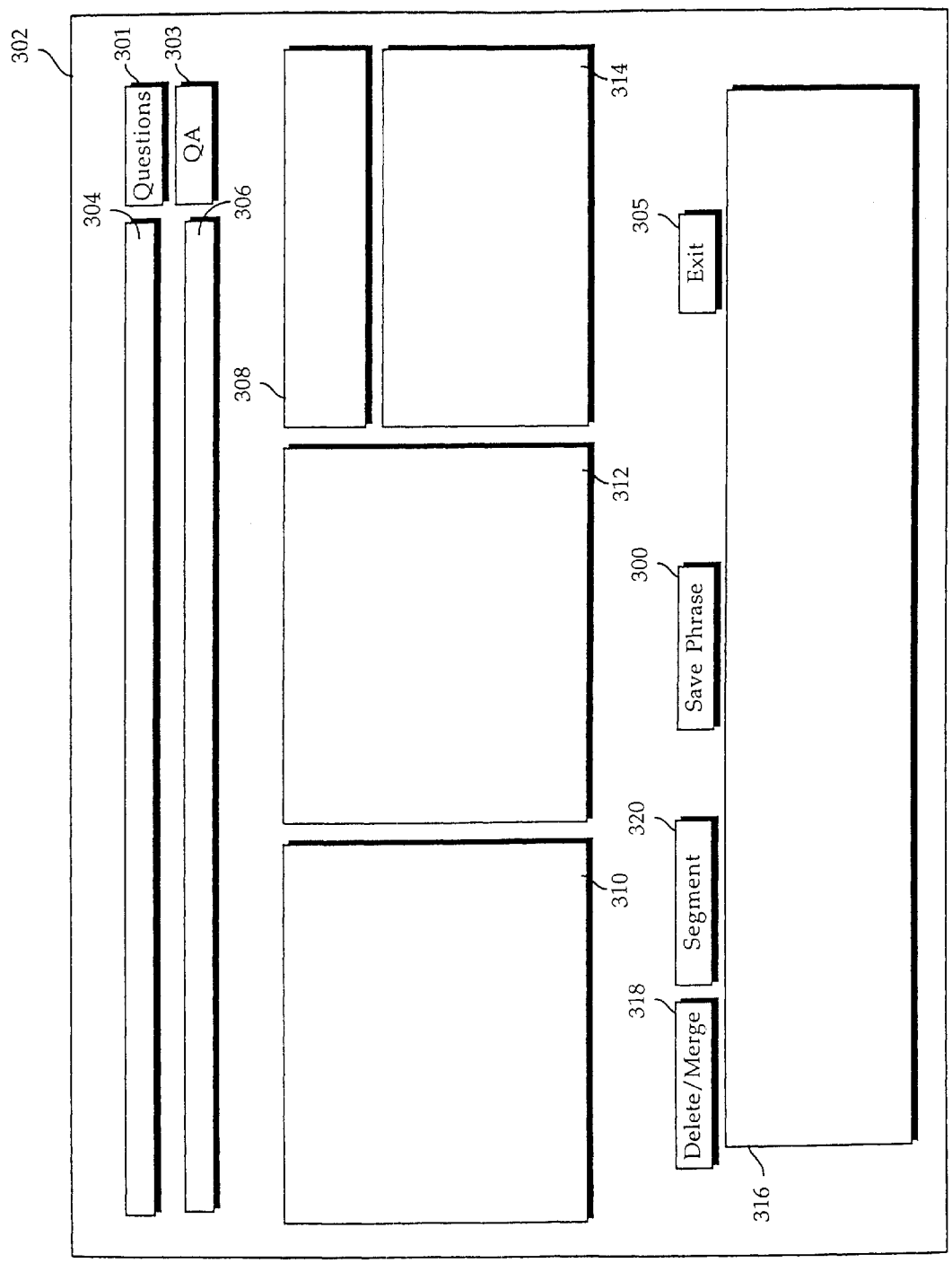
FIGS. 3A–3F illustrate a cataloguing facility user interface screen for reviewing input data and associating the input data with catalogue and attribute elements according to an embodiment of the invention.
Figure 3B:
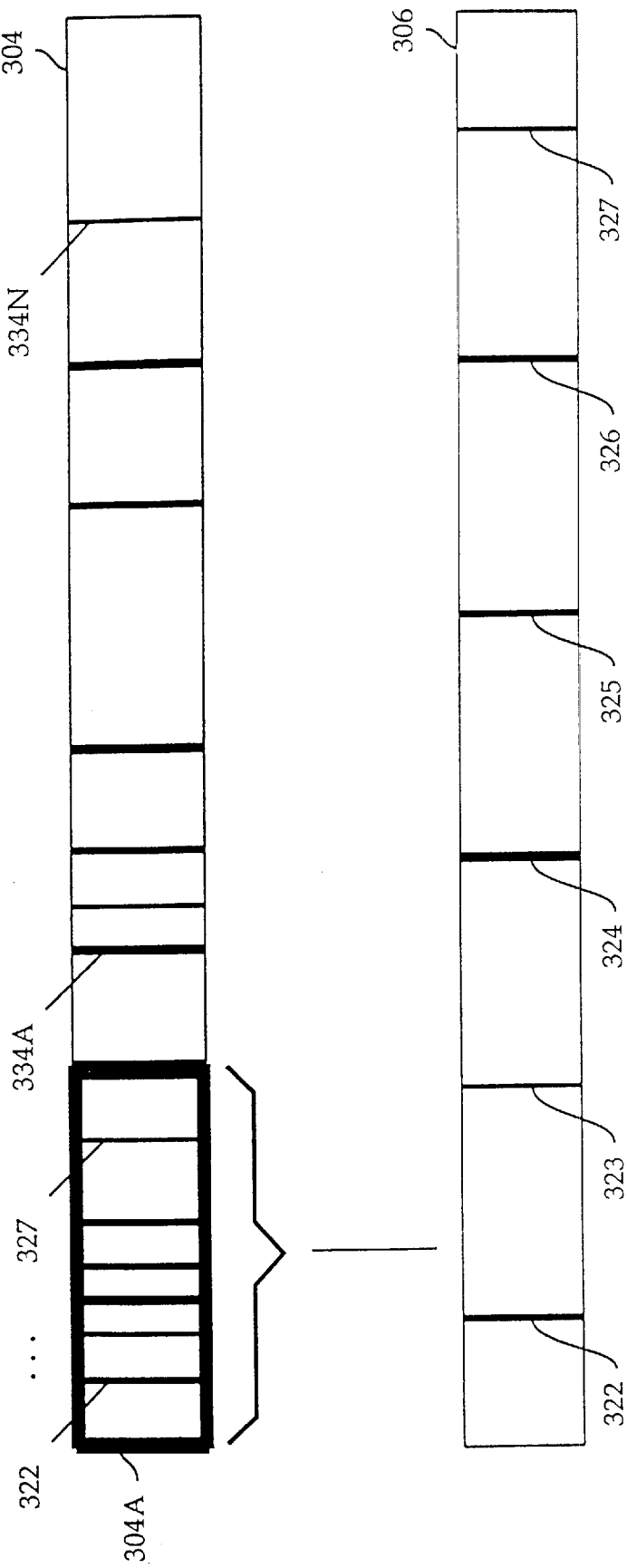
Figure 3C:
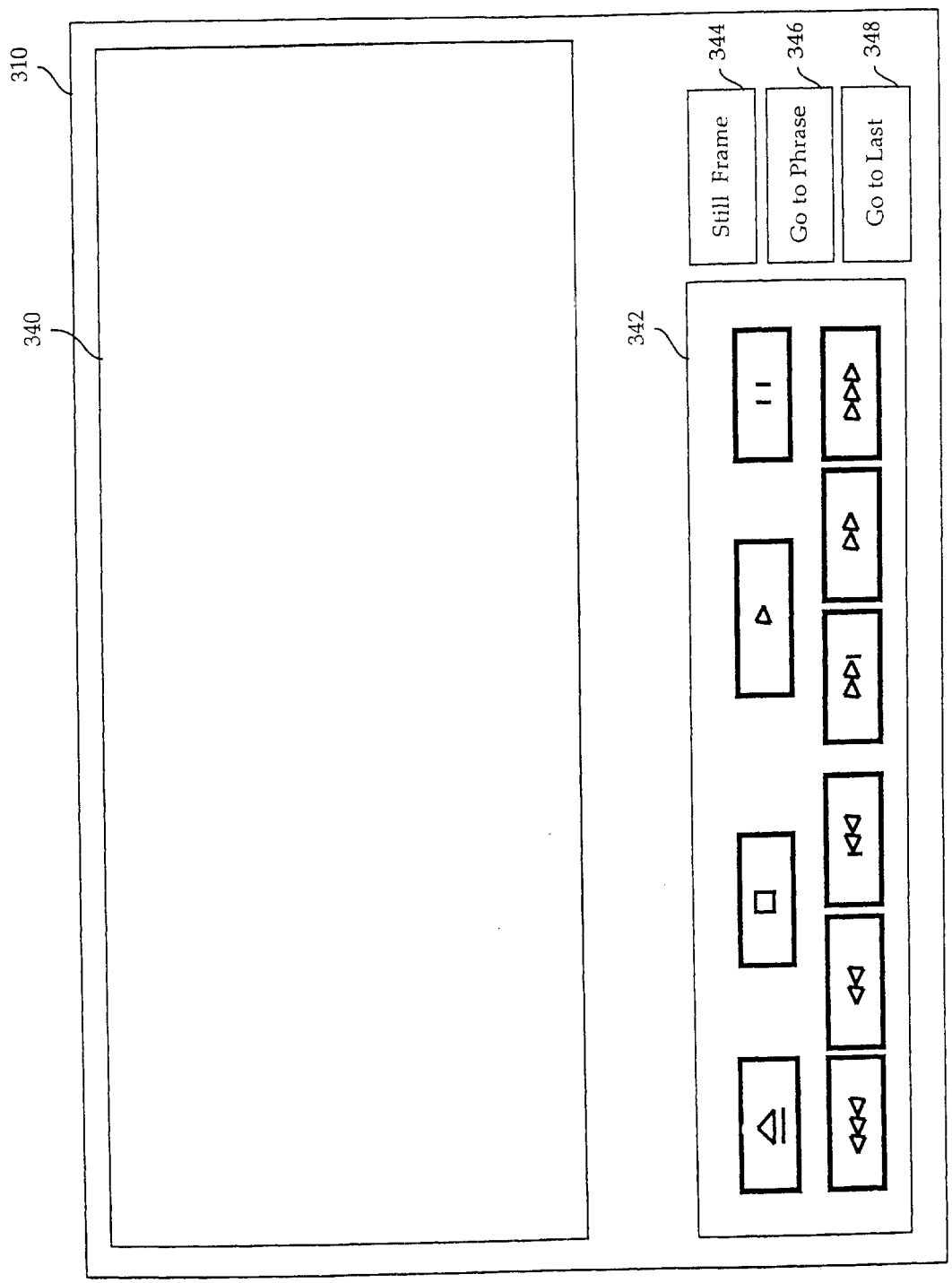
Figure 3D:
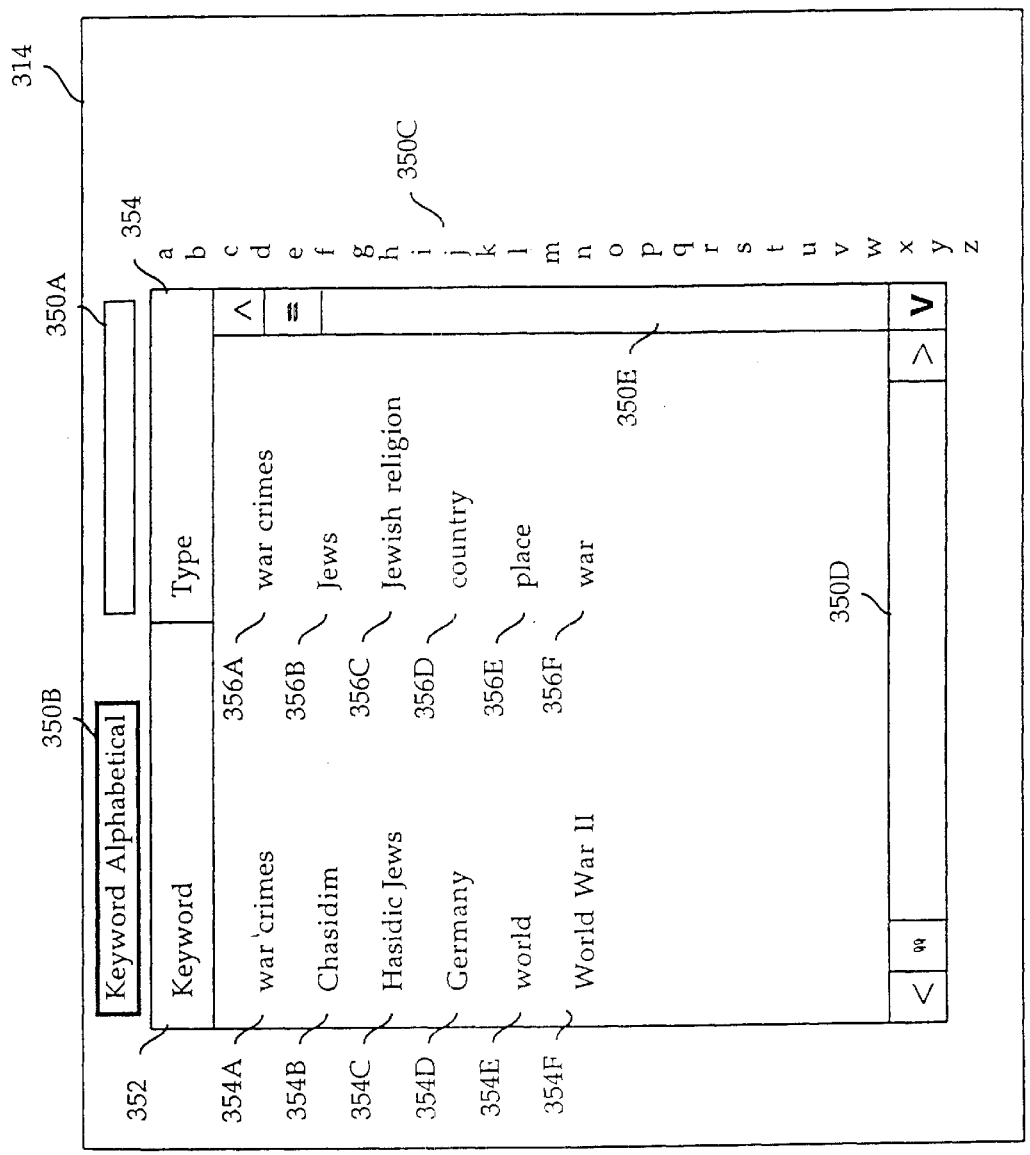

Referring to FIG. 3A, a keyword viewer 314 is provided in screen 302. FIG. 3D provides a detailed example of keyword viewer 314. Keyword viewer 314 includes areas 352 and 354 for viewing keyword and type instances, respectively. For example, keywords 354A–354F can be viewed sub-area 352. Type instances associated with the keyword instances 354A–354F can be seen in sub-area 354.

Scrolling facilities 350D and 350E can be used to scroll through the keyword and type instances. In addition to scrolling facilities 350D and 350E, viewing controls 350A–350C provide functionality to scroll through the keyword and type instances. Viewing control 350B identifies the ordering in which the keyword and type instances can be viewed (e.g., alphabetical). Viewing control 350A provides the ability to locate a keyword or type instance by typing in all or part of its value. Viewing control 350C allows the user to select the keyword or type instances for viewing by selecting a letter of the alphabet. The keyword or type instances that begin with the selected letter are displayed in sub-areas 352 and 354.

Referring to FIG. 3A, instances of event 208 are displayed in viewing areas 304 and 306. FIG. 3B provides a detailed example of viewing areas 304 and 306. Viewing areas 304 and 306 display an event timeline. An event timeline contains an indicator for each instance of event 208 in the order in which they occur in the input data to which they are associated. The ordering is preferably identified by a timecode that is determined by assigning a time zero to the beginning of the input data and incrementing a time counter to identify the elapsed time (hour, minute, second, etc.), for example.

Marks 322–327 and 334A–33N are used to signify an event. One or more marks can be used for an instance of event 208. A mark, or marks, that represent an instance of event 208 can be color coded based on the event type. For example a black mark can represent a chapter segment. A pink mark can represent a phrase. Yellow, brown, green, and blue marks can be used to represent quality assurance marks, for example.

Box 304A is referred to as a zoom box. The marks contained within zoom box 304A (e.g., marks 322–327) are magnified, or expanded in event viewing box 306. Viewing box 306 contains an expanded view of marks 322–327 included in zoom box 304A. The expanded view of viewing area 306 facilities the viewing and selection of marks. By selecting a mark, a user can navigate to the portion of the input data that is associated with the mark. Thus, for example, a quality assurance mark can be selected to view the input data that prompted the creation of the mark.

Descriptions or notes can be entered and associated with an element using the cataloguing interface. Referring to FIG. 3A, an input area 312 is provided to enter a description for a phrase, segment, or image instance, for example. The description is referred to as a descriptive phrase. A descriptive phrase associated with an instance of phrase 206 is parsed to identify a plurality of instances of keyword 210 and person 218 to be associated with the instance of phrase 206.

Figure 3E:
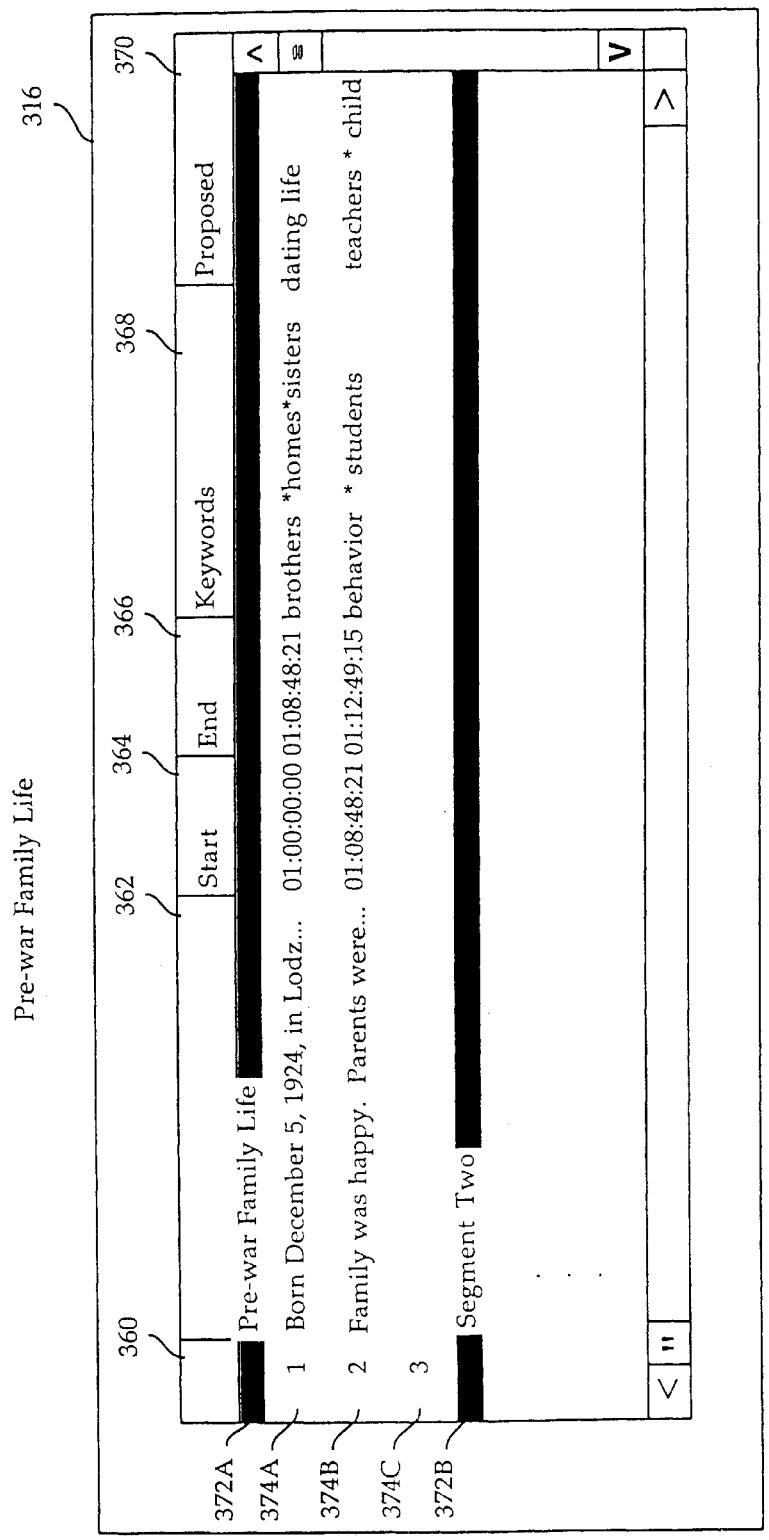

The cataloguing interface further provides a summary display region to view existing chapter segments (i.e., instances of segment 204) and instance of phrase 206. Area 316 of screen 302 is used to display a summary of chapter segments and phrases for the input data. FIG. 3E provides a detailed example of viewing area 316 of FIG. 3A according to an embodiment of the invention.

Referring to FIG. 3E, viewing area 316 includes a window having scrolling capability. The viewing area is comprised of a multiple columns. Column 360 displays a number associated with a phrase displayed in viewing area 316. Columns 362, 364, 366, 368 and 370 contain information associated with phrase and segment instances. Column 362 contains the descriptive phrase entered for the phrase or segment instance. Columns 364 and 366 contain start and end timecodes, respectively. Columns 368 and 370 identify keywords and proposed keywords, respectively. Horizontal and vertical scrolling capabilities are also provided. Lines 372A–372B and 374A–374C provide examples of displayed information for segment and phrase instances, respectively.

Figure 3F:
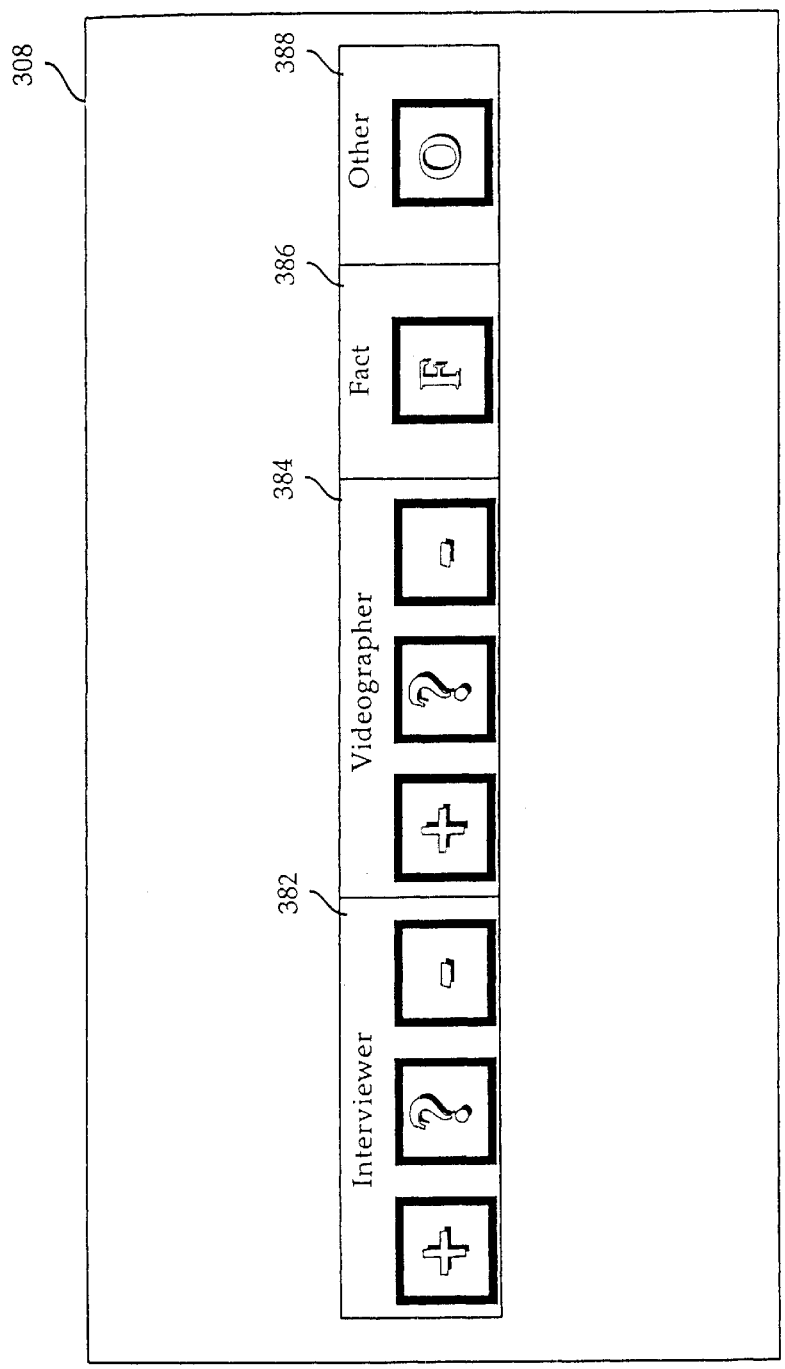

Instances of event 208 can be created using the cataloguing interface. An instance of event 208 is created when an instance of segment 204 or phrase 206 is created. Referring to FIG. 3A, area 308 is used to create a quality assurance event. FIG. 3F provides a more detailed view of area 308 of FIG. 3A according to an embodiment of the invention. Referring to FIG. 3F, area 308 contains sub-areas 382–388.

Sub-area 382 provides buttons for creating a positive ("+"), negative ("−") and informational ("?") quality assurance event associated with a participant (e.g., interviewer) in the data collection process. Similarly, sub-area 384 is used to create quality assurance events related to another data collection participant (e.g., videographer). A fact that is to be checked can prompt the creation of a quality assurance event using sub-area 386. A miscellaneous quality assurance event can be created using sub-area 388.

Operations can be selected using control buttons included in the cataloguing interface. Referring to FIG. 3A, control button 318 can be used to delete a chapter segment or phrase or to merge two chapter segment or two phrases. The user can select an instance of segment 204 or phrase 206 in area 316 (e.g., lines 372A–372B and 374A–374C of FIG. 3E) and select control button 318, for example. Control button 320 is used to insert a chapter heading above a highlighted line (e.g., lines 374B or 374C). For example, the user can select an instance of segment 204 in area 316 (e.g., lines 372A–372B of FIG. 3E) and select control button 318. Control button 300 is used to save the descriptive phrase for a phrase. When control button 300 is pressed, the descriptive phrase is parsed to identify existing attribute elements (e.g., keyword 210) that are related to the new instance of phrase 206.

Figure 4:
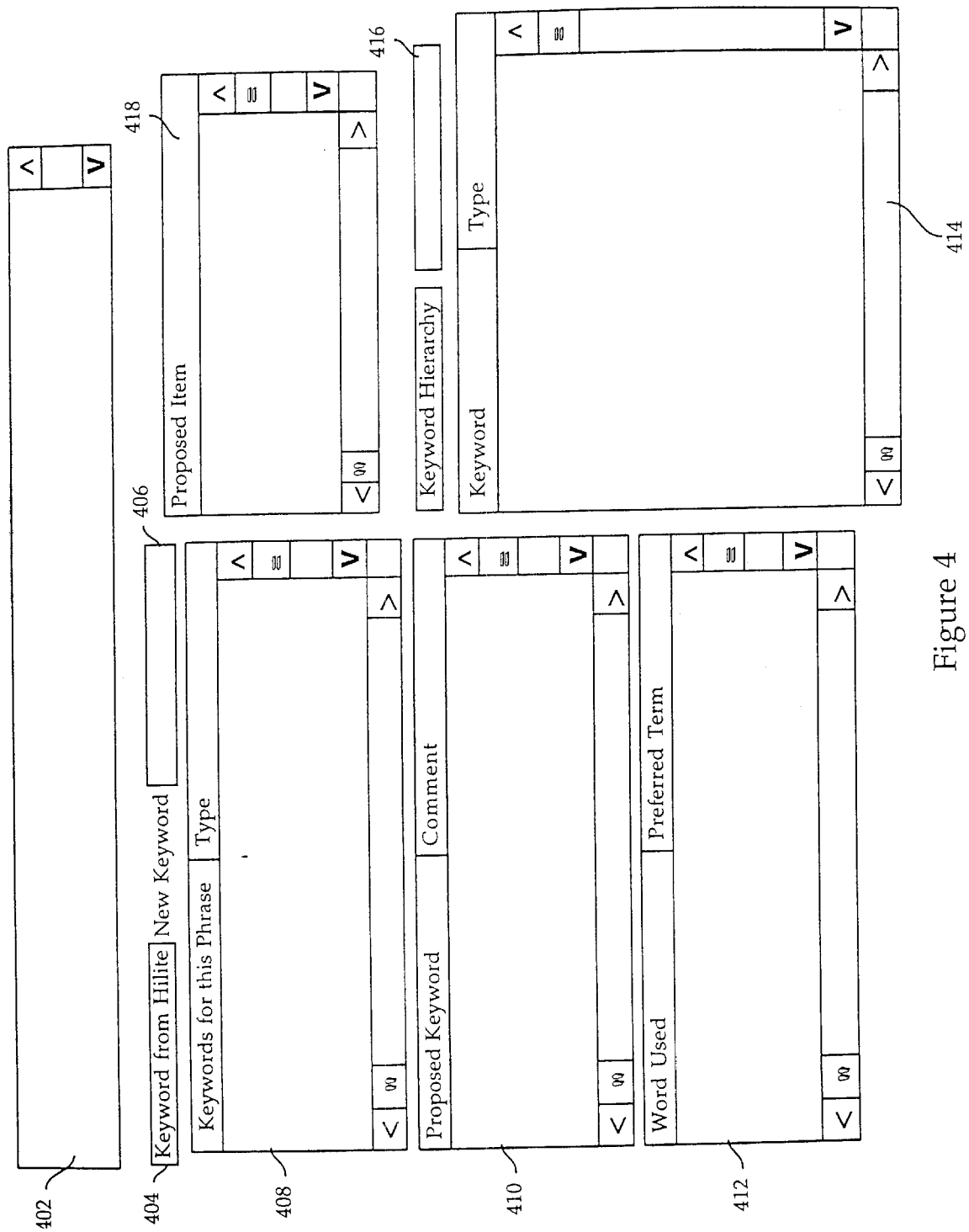
FIG. 4 provides an example of a cataloguing facility user interface screen for viewing keywords, identifying proposed and thesaural values according to an embodiment of the invention.

Control button 318 also triggers the display of a screen, as illustrated in FIG. 4, for viewing keywords, identifying proposed and thesaural values. Referring to FIG. 4, block 402 provides a area for viewing a descriptive note. When control button 318 is pressed, the descriptive note is parsed. The user can identify or propose keywords that are not identified during the parsing of the descriptive note. An instance of proposed keyword 214 can be entered in block 410 along with an associated comment. Previously proposed items can be viewed in block 418. Existing instances of keyword 210 can be viewed along with their types in block 414. Various scrolling techniques can be used to scroll through the existing keywords as described in conjunction with FIG. 3A–3F. A thesaural attribute element (e.g., thesaural keyword 212) can be entered in block 412. In block 412, the attribute element is entered in the "Word Used" column and the thesaural term is entered in the "Preferred Term" column. A new instance of keyword 210 can be proposed (i.e., a proposed keyword 214 can be created) by highlighting a value from block 402 and pressing block 404. A proposed keyword 214 can also be created by typing a value into block 406.

Figure 5:
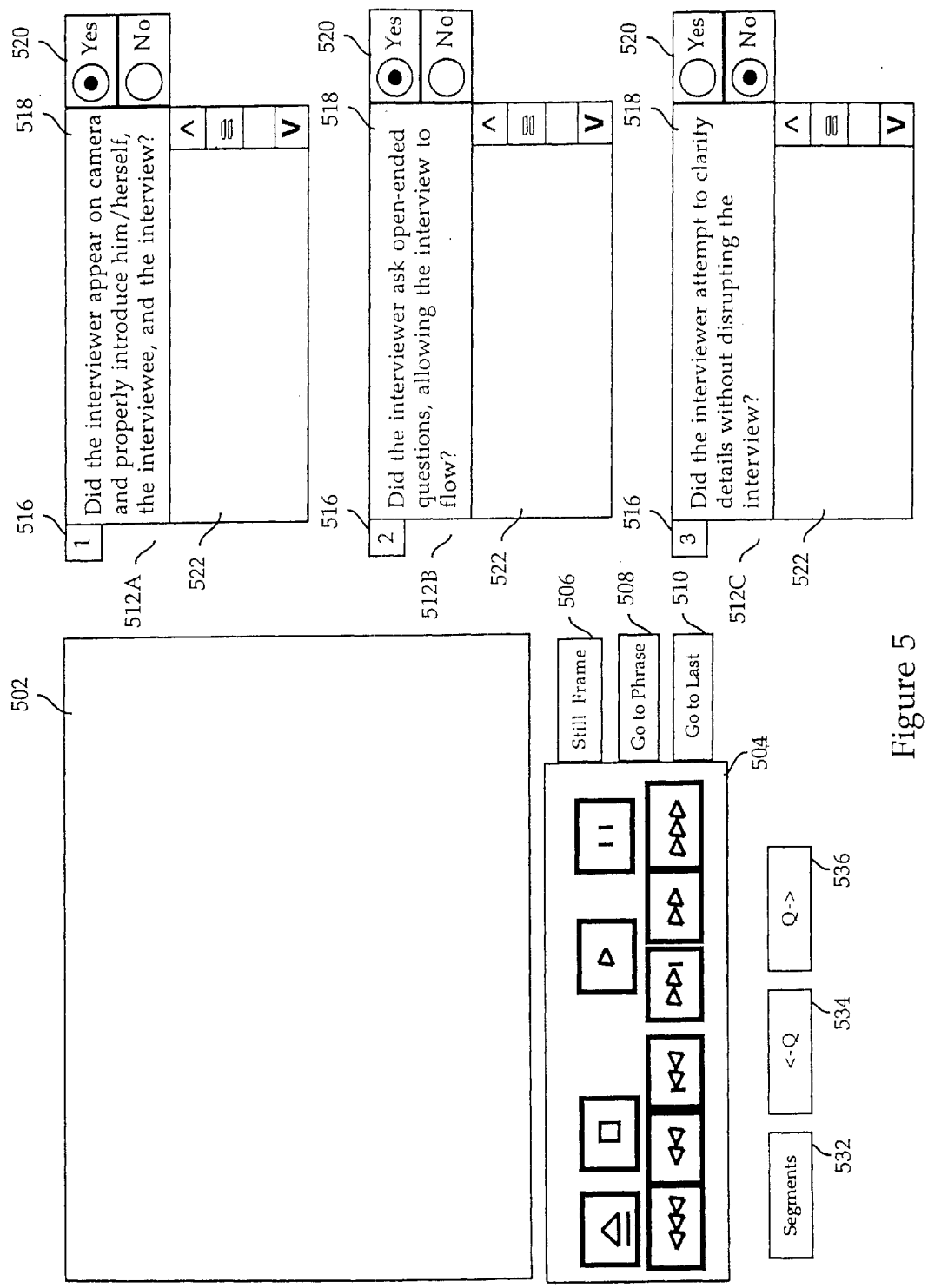
FIG. 5 provides an example of a quality assurance entry screen according to an embodiment of the invention.

In the preferred embodiment, a series of questions are posed to the user to assess the quality of the data collection process. Referring to FIG. 3A, button 301 is used to jump to the quality assurance questions screen. The user can scroll through the questions to specify answers. The questions screen allows the user to view the input data as well. FIG. 5 provides an example of a quality assurance entry screen including quality assurance questions according to an embodiment of the invention.

Block 502 provides an area for viewing the input data. Controls 504 allow the user to navigate through the input data. Blocks 506, 508, 510 are as previously described in FIG. 3C (e.g., blocks 344, 346, and 348). The screen also contains areas 512A–512C for viewing and responding to a question. Block 516 identifies the number of the question. Block 518 contains the quality assurance question. The user can respond with a short answer (e.g., a yes or no answer) using block 520. In addition, the user can enter comments in block 522. A scrolling capability is provided to allow the user to scroll through a comment. The user can scroll through the questions using blocks 534 and 536. For example, by pressing block 536, question one (block 512A) scrolls off the screen, questions two and three (blocks 512B and 512C) scroll up, and a fourth question appears at the bottom of the screen. The user can return to the screen illustrated in FIGS. 3A–3F by pressing block 532.

Figure 6:
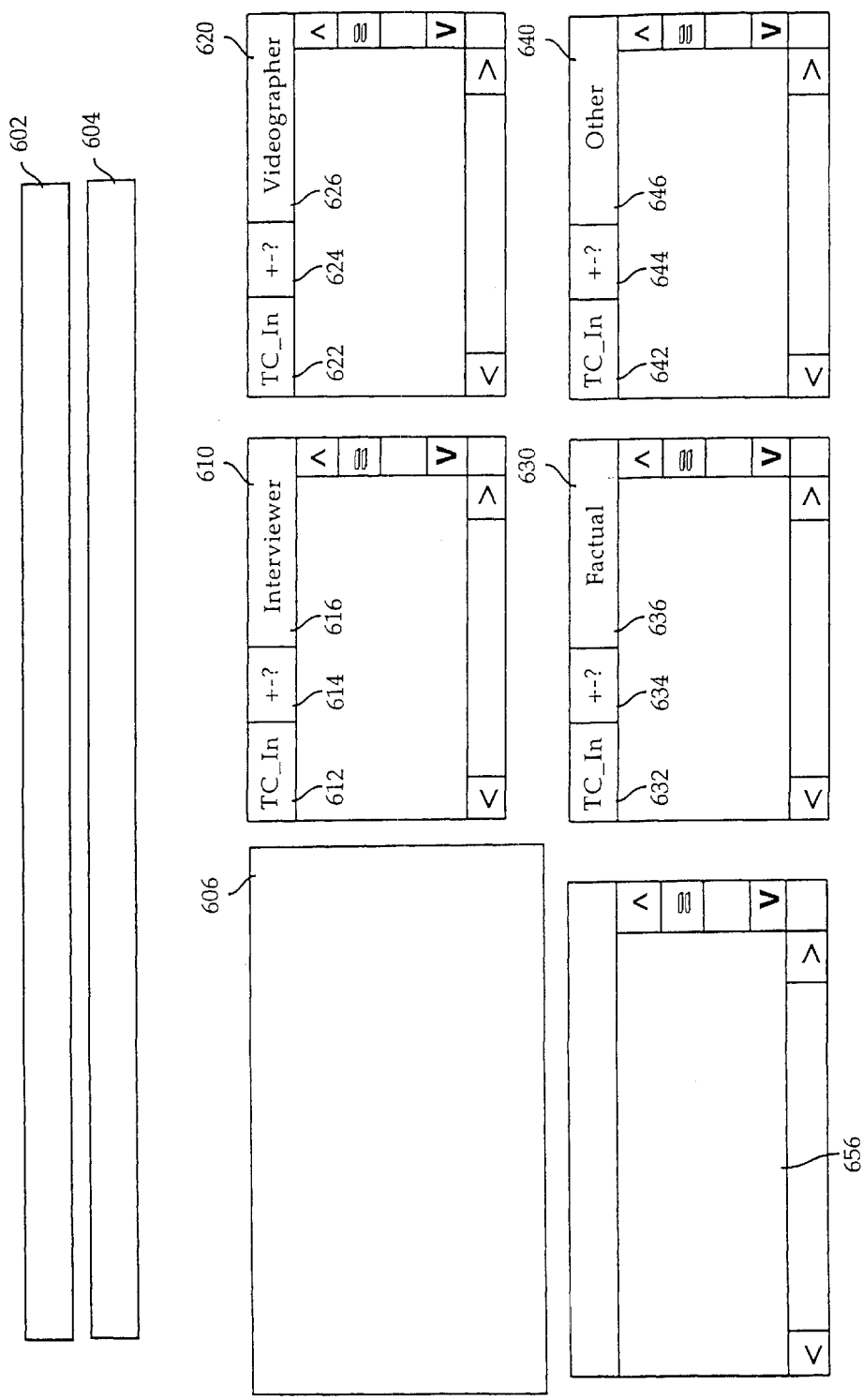
FIG. 6 provides an example of a screen for viewing event and image information according to an embodiment of the invention.

In the preferred embodiment, another screen is provided to allow a user to view events and the input data associated with an event as well as the instances of image 220 associated with the input data. FIG. 6 provides an example of a screen for viewing event and image information according to an embodiment of the invention. Block 606 provides an area to view the input data (e.g., such as that provided in block 340 of FIG. 3C). Block 606 also provides controls for navigating through the data (such as in block 342 of FIG. 3C) and displaying other cataloguing interface screens (e.g., control buttons 344, 346, and 348 of FIG. 3C). In addition, areas 602 and 604 are provided for displaying an event timeline. Viewing areas 602 and 604 are similar to viewing areas 304 and 306 of FIG. 3B. Like viewing area 304, viewing area 602 includes a zoom box (e.g., zoom box 304A of FIG. 3B) for identifying the events for display in viewing area 604. The user can select a mark displayed in viewing area 304 or 306 to view the input data associated with the mark in area 606.

Blocks 610, 620, 630, and 640 display the interviewer, videographer, fact, and other event types. In each of blocks 610, 620, 630, 640, the event's starting time (e.g., the time increment associated with the input data at which the mark was entered), a classification for the mark (e.g., positive, negative, or informational), and the descriptive phrase associated with the event.

Using the screen of FIG. 6, the user can view and scroll through event information. A mark associated with an event can be located in viewing areas 602 and 604. In addition, the user can view the input data that prompted the mark in area 606. The screen provides an interactive report of the quality assurance information associated with the input data.

Catalogue Interface Processing

The cataloguing interface screens presented in FIGS. 3A–3F and 4–6 illustrate an interface for viewing input data and the cataloguing information associated with the input data. The cataloguing interface also provides the ability to enter catalogue and attribute information and create elements. A catalogue interface processing capability is provided by the invention.

Referring to FIG. 3A, a user can view the input data in area 310, enter a description in area 312. By selecting button 320, the user can create an instance of segment 204. Button 300 allows the user to create an instance phrase 206. Using button 318, a user can delete an instance of segment 204 or phrase 206. By deleting an instance of segment 204 that contains instances of phrase 206 a user can re-associate the instances of phrase 204 with a remaining instance of segment 204. For example, the user can select an instance of segment 204 (e.g., by selecting one of lines 372A–372B of FIG. 3E) and selecting button 318. If the user selects segment 372B, for example, the instances of phrase 206 associated with segment 372B are merged into segment 372A. Similarly, to delete a phrase instance, the user can select an instance of phrase 206 (e.g., displayed in lines 374A–374B of FIG. 3E) and select button 318.

Referring to FIG. 3F, an instance of event 208 can be created by selecting a button in area 382, 384, 386, or 388. Referring to FIG. 3C, a user can select button 344 to create an instance of image 220. Referring to FIG. 4, a user can create an instance of proposed keyword 214, proposed person 224, thesaural keyword 212, or thesaural person 222.

Figure 8A:
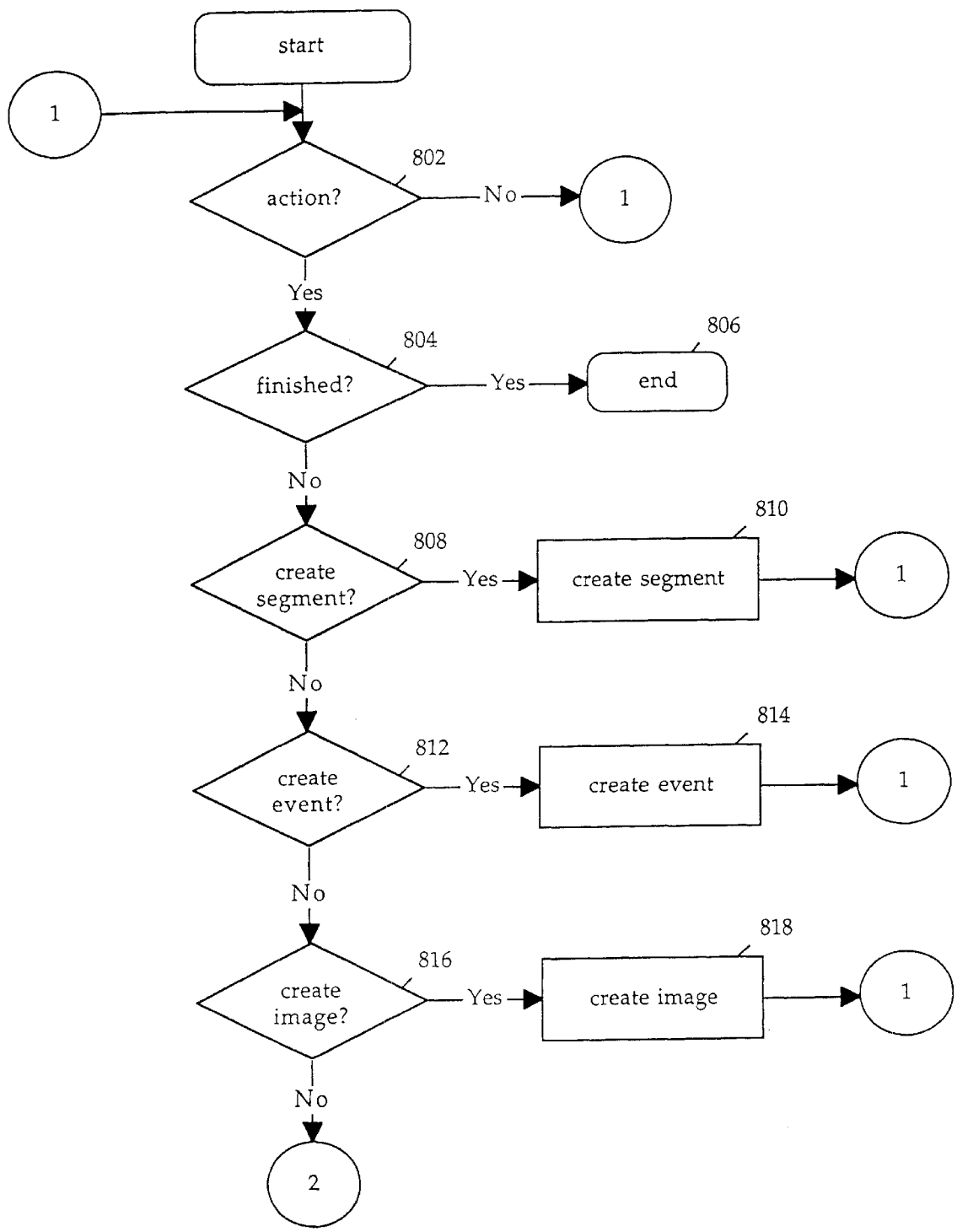
FIGS. 8A–8B provide an example of a process flow for processing creation and modification user input according to an embodiment of the invention.
Figure 8B:
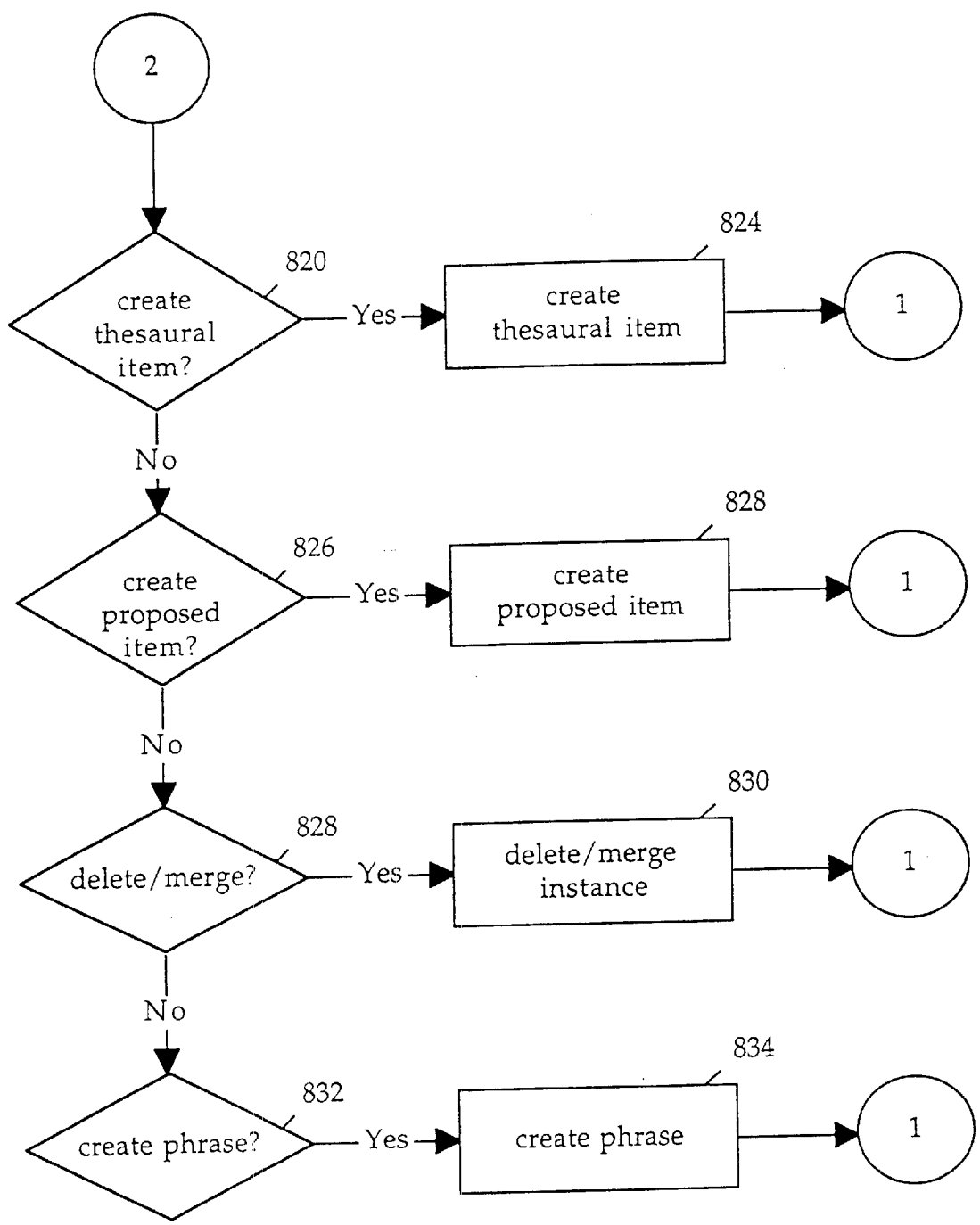

Thus, the cataloguing interface provides the ability to specify actions for creating and modifying cataloguing information. FIGS. 8A–8B provide an example of a process flow for processing creation and modification user input according to an embodiment of the invention.

At step 802 (i.e., "action?"), a determination is made whether an action has been invoked by the user. Processing continues at step 802 until an action is specified by the user. If the action indicates that the user is finished (e.g., the user selects the exit button 305 of FIG. 3A), processing ends at step 806. If not, processing continues at step 808. At step 808 (i.e., "create segment?"), a determination is made whether a "create segment" operation is specified by the user (e.g., the user selects button 320 of FIG. 3A). If yes, processing continues at step 810 to create the segment. Processing then returns to step 802 to receive another user action.

If it is determined that a create segment operation is not specified, processing continues at step 812. At step 812 (i.e., "create event?"), a determination is made whether a create event operation is specified by the user (e.g., the user selects a button in areas 382–388 of FIG. 3F). If yes, processing continues at step 814 to create the event. Processing then returns to step 802 to receive another user action. If it is determined that a create event operation is not specified, processing continues at step 816. At step 816 (i.e., "create image?"), a determination is made whether a create image operation is specified by the user input (e.g., the user enters image data in block 656 of FIG. 6). If so, processing continues at step 818 to create the event and then returns to step 802 to receive another user action.

If it is determined, at step 816, that the user action is not a create image operation, processing continues at step 820. If it is determined, at step 820, (i.e., "create thesaural item?") that a create thesaural instance operation is specified by the user (e.g., the user enters thesaural data in block 412 of FIG. 4), processing continues at step 824 to create the thesaural instance and then returns to step 802 to receive another user action.

If it is determined, at step 820, that the user action is not a create thesaural instance operation, processing continues at step 826. If it is determined, at step 826 (i.e., "create proposed item?"), that a create proposed instance operation is specified by the user (e.g., the user enters proposed data in block 418 of FIG. 4), processing continues at step 828 to create the proposed instance and then returns to step 802 to receive another user action.

If it is determined, at step 826, that the operation is not a create proposed instance operation, processing continues at step 828. A determination is made at step 828 (i.e., "delete/merge?") whether a delete/merge operation is invoked by the user (e.g., the user selects button 318 of FIG. 3A). If so, processing continues at step 830 to perform the operation and then returns to step 802. If it is determined that it is not a delete/merge operation, processing continues at step 832. A determination is made at step 832 (i.e., "create phrase?"), whether the operation is a create phrase operation (e.g., the user selects button 300 of FIG. 3A). If so, processing continues at step 834 to create the phrase instance and then returns to step 802.

Figure 9A:
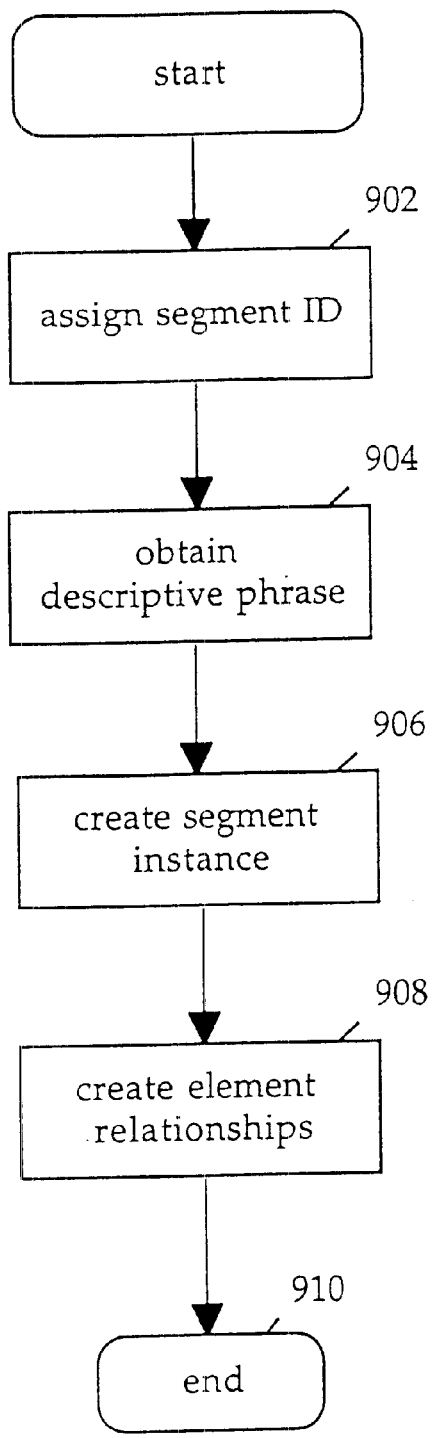
FIG. 9A provides an example of a create segment process flow according to an embodiment of the invention.

As previously indicated, the elements have associated attributes (e.g., the attributes identified in FIG. 2D). The cataloguing interface is used to populate the attributes of an element. The attributes can be generated by the creation process or specified by the user, for example. Thus, for example, the cataloguing interface can be used to create an instance of segment 204 included including the definition of attributes of segment 204. FIG. 9A provides an example of a create segment process flow according to an embodiment of the invention.

At step 902, the creation process creates an ID for the new instance of segment 204. The descriptive phrase entered by the user (in area 312 of FIG. 3A, for example) is used to initialize the descriptive phrase attribute of the new instance at step 904. At step 906, the segment instance is created.

At step 908, element relationships are established between the new segment instance and other elements. Referring to FIG. 2B, segment 204 is related to other instances of segment 204 and instances of phrase 206. Thus, for example, the new instance of segment 204 can be related to instances of phrase 206. The instance(s) of phrase 206 related to the new instance of segment 204 in step 908 are contained within the new segment instance.

The instances of phrase 206 that are related to the new segment instance can be identified in the user interface. Referring to FIG. 3E, the instances of phrase 206 displayed in line 374A–374C are related to an instance of segment 204 (as displayed in line 372A). The user can select line 374B and then select button 320 of FIG. 3A. The process of FIG. 9A is invoked as a result. The instance of segment 204 created in step 906 becomes the container for the instances of phrase 206 associated with lines 374B–374C of FIG. 3E. At step 908, the previous relationship between the instances of phrase 206 (displayed in lines 374B–374C) and the instance of segment 204 (displayed in line 372A) is deleted and a new relationship is created between the new instance of segment 204 and the instances of phrase 206 displayed in lines 374B–374C.

Figure 9B:
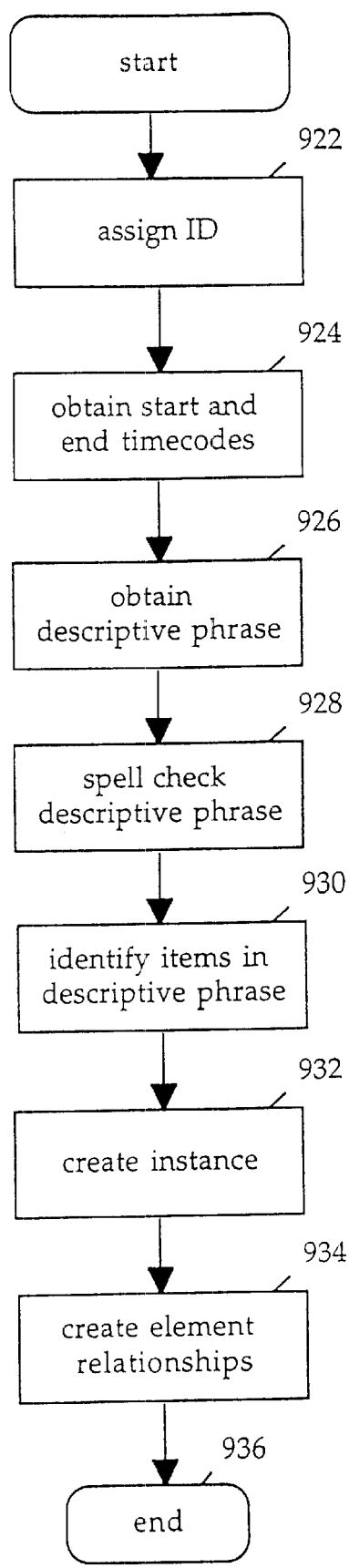
FIG. 9B provides an example of a phrase creation process flow according to an embodiment of the invention.

As with segment 204, the cataloguing interface provides a mechanism for creating an instance of phrase 206. FIG. 9B provides an example of a phrase creation process flow according to an embodiment of the invention. At step 922, an ID is generating for the new instance of phrase 206. At step 924, the start and end timecodes associated with the phrase are obtained. The descriptive phrase is obtained at step 926. At step 928, a spell checker is used to check the descriptive phrase. At step 930, the descriptive phrase is parsed to identify attributes of elements such as labels or values associated with keyword and person elements (i.e., keyword 210 and person 218) contained within the descriptive phrase. At step 932, an instance of phrase 206 is created.

At step 934, the relationships are formed between the new instance and other elements. Referring to FIG. 2B, phrase 206 can be related to an instance of segment 204 (e.g., a chapter segment) and instances of proposed keyword 214, keyword 210, image 220, proposed person 224 and person 218. The relationships between the new instance and instances of keyword 210 and person 224 are identified during step 930. Relationships are established between the new instance and these identified instances in step 934. Relationships between the new instance and proposed keyword 210 and proposed person 224 are formed when the proposed attribute element instances are created (see FIGS. 4 and 11).

Figure 10:
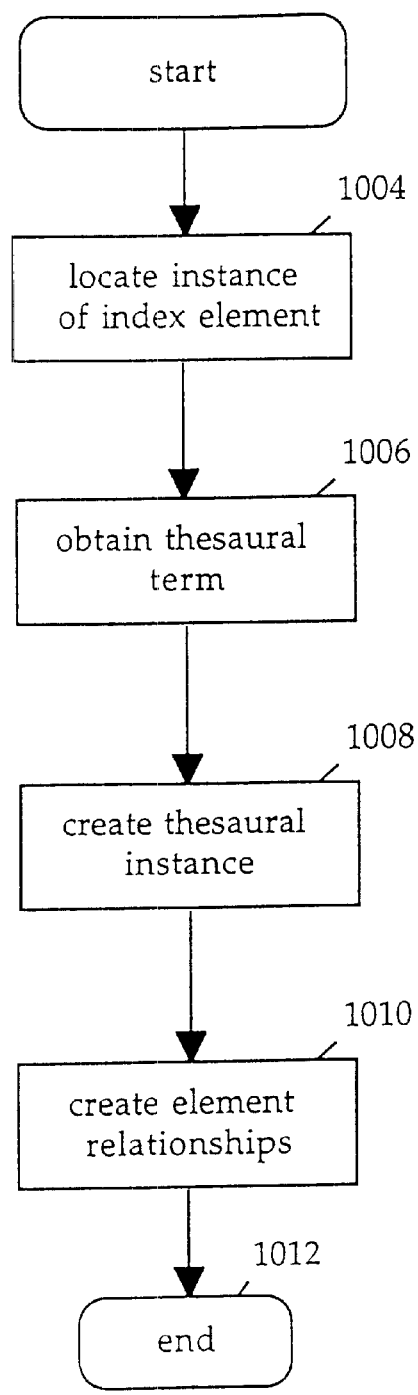
FIG. 10 provides an example of a process flow for creating a thesaural element according to an embodiment of the invention.
Figure 11:
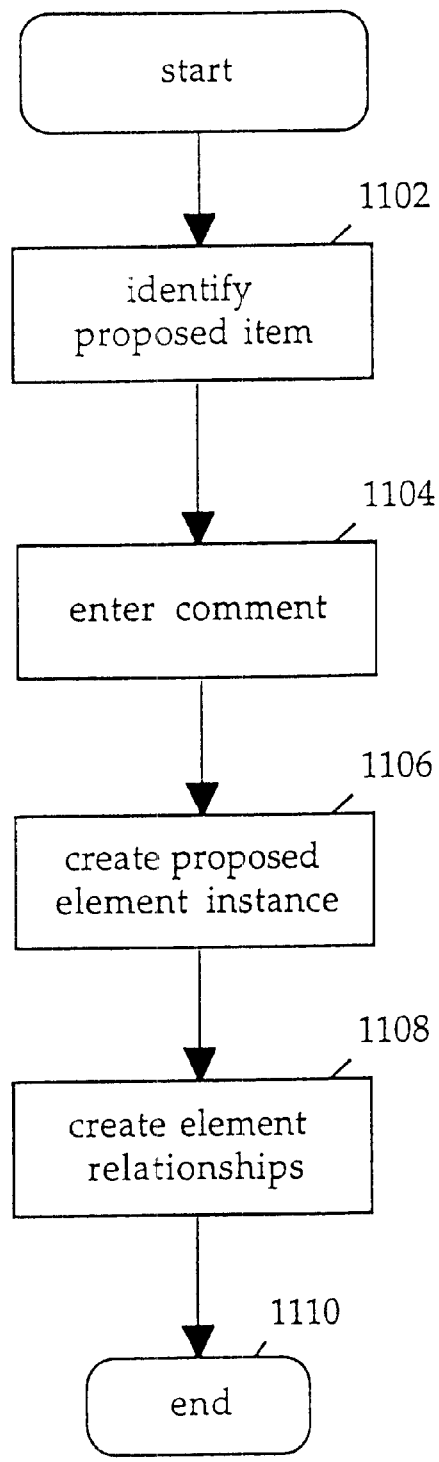
FIG. 11 provides and example of a process flow for creating a proposed element according to an embodiment of the invention.

When the user selects the "Save Phrase" button (button 300 in FIG. 3A), the phrase is saved as illustrated in FIG. 9B. In addition, a phrase management screen (an example is provided in FIG. 4) is displayed. As previously described, the user uses this screen to review keywords instances associated with the phrase instance and the entire keyword hierarchy. The user can also enter proposed and thesaural attribute elements using this screen (e.g., blocks 410, 412, and 418). FIGS. 10 and 11 provide examples of a process flow for creating a thesaural attribute element (e.g., thesaural keyword 212 and thesaural person 222) and a proposed attribute element (e.g., proposed keyword 214 and proposed person 224), respectively.

Referring to FIG. 10, the element identified in the input screen (e.g., block 412 of FIG. 4) is obtained at step 1004. The thesaural value is obtained from the input screen (e.g., block 412 of FIG. 4) at step 1006. An instance of the thesaural attribute element (e.g., thesaural keyword 212 and thesaural person 22) is created at step 1008. The element relationships are created at step 1010. Referring to FIG. 2B, a relationship can exist between keyword 210 and thesaural keyword 212 (e.g., relationship 238), and between person 218 and thesaural person 222 (e.g., relationship 234). At step 1010, the element located at step 1004 is related to the new thesaural instance created at step 1008.

FIG. 11 provides an example of a process flow for creating a proposed element (e.g., proposed keyword 214 and proposed person 224), respectively. At step 1102, the proposed item entered by the user is obtained from the input screen (e.g., block 410 of FIG. 4). A comment associated with the proposed item is obtained from the input screen at step 1104 (e.g., block 410 of FIG. 4). An instance of the proposed attribute element is created at step 1106. Relationships are formed between the new instance and other elements at step 1008. Referring to FIG. 2B, a proposed keyword 214 and proposed person 224 are related to phrase 206. The proposed instance created at step 1106 is related to an instance of phrase 206.

Figure 12:
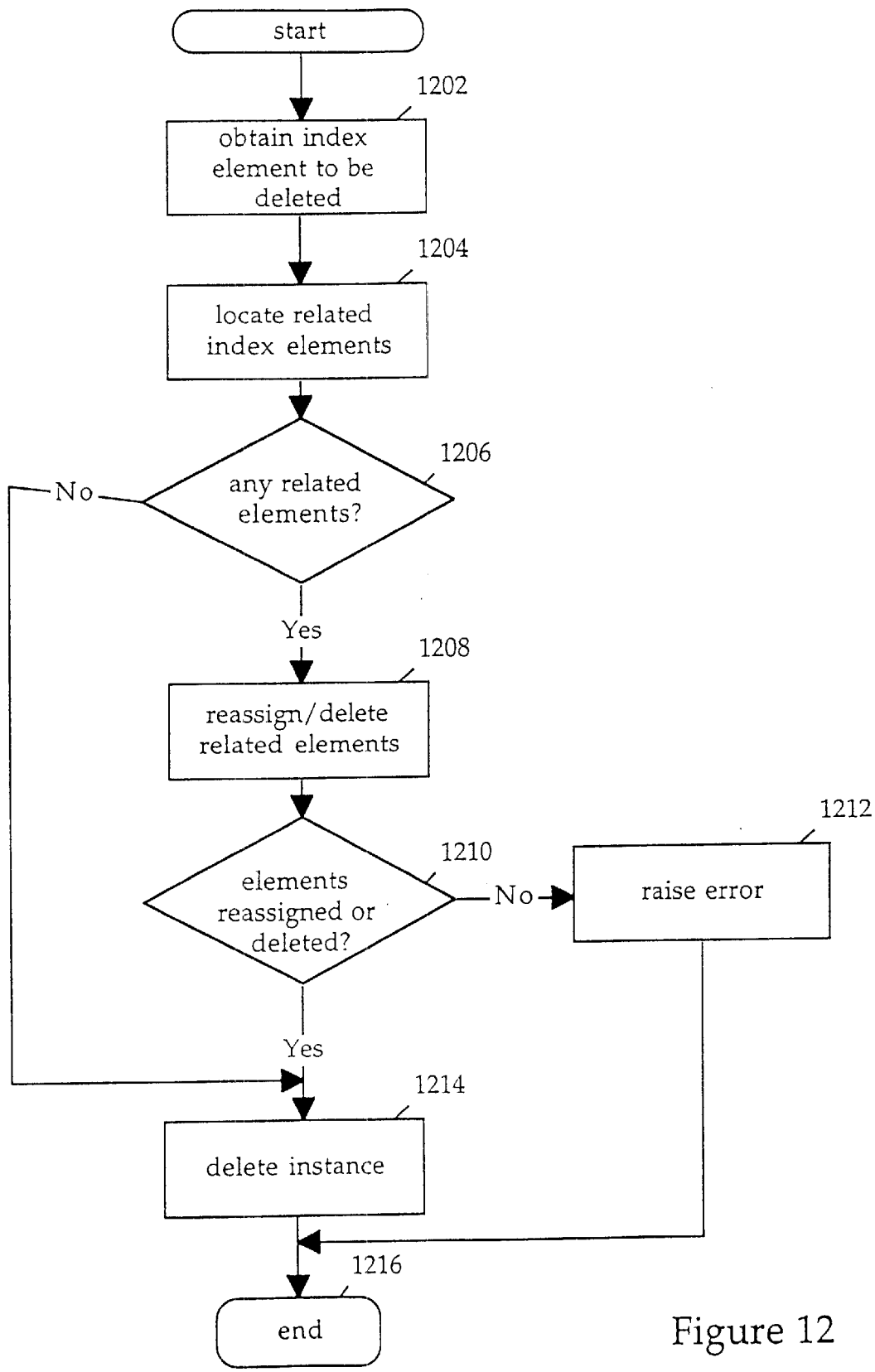
FIG. 12 provides an example of a process flow for delete and merge operations according to an embodiment of the invention.

Referring to FIG. 3A, a user can choose to delete or merge element instances by selected button 318. FIG. 12 provides an example of a process flow for the delete and merge operations according to an embodiment of the invention. At step 1202, the element selected by the user (e.g., an instance of segment 204 or phrase 206 displayed in area 316 of FIGS. 3A and 3E) displayed on the input screen and by the user is identified. At step 1204, elements that are related to the element selected by the user are identified (e.g., instances of phrase 206 if the selected item is an instance of segment 204; or instances of proposed keyword 214, keyword 210, image 220, proposed person 224, and person 218, if the selected item is an instance of phrase 206).

At step 1206 (i.e., "any related elements?), a determination is made whether the selected element has any related elements. If the selected element does not have any related elements, processing continues to 1214 to delete the element. If there are related elements, they must be deleted or merged into another hierarchy before deleting the selected element. For example, if the selected element is an instance of segment 204, instances of phrase 206 that are related to the instance of segment 204 are merged into another instance of segment 204. That is, the instances of phrase 206 are related to the other instance of segment 204. Referring to FIG. 3E, instances of phrase 206 associated with the segment instance displayed in line 372B can be merged into the segment instance displayed in line 372A. If they are not merged, the related elements are deleted.

At step 1210 (i.e., "elements reassigned or deleted?), a determination is made whether the reassignment or deletion of related elements was successful. If not, processing continues at step 1212 to raise an error. If the reassignment or deletion was successful, processing continues at step 1214 to delete the element selected for deletion.

Figure 13A:
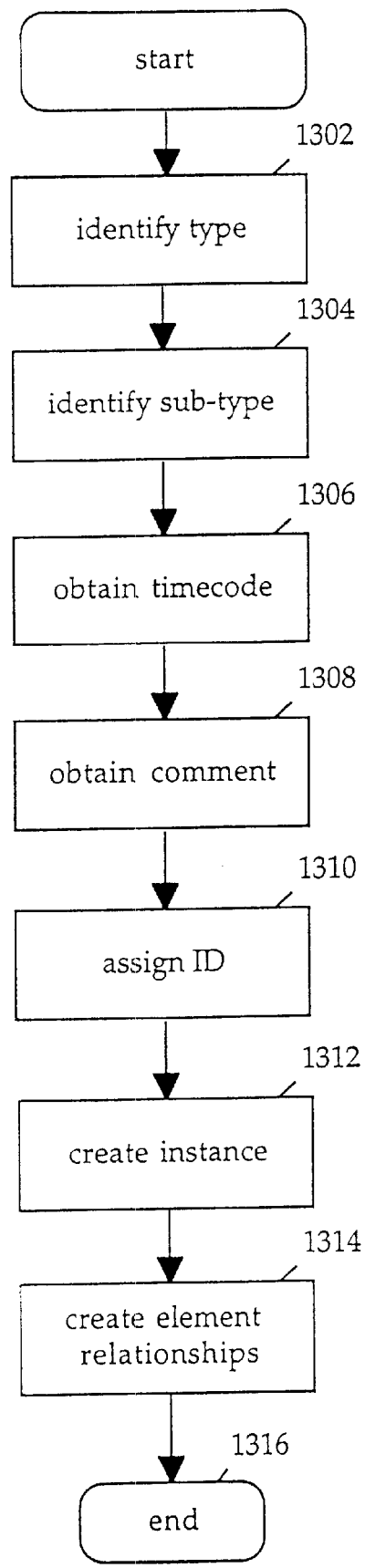
FIG. 13A provides an example of a process flow for creating an event instance according to an embodiment of the present invention.

An instance of event 208 can be created using the cataloguing interface. FIG. 13A provides an example of a process flow for creating an event instance according to an embodiment of the present invention. At step 1302, the type of event is identified. Referring to FIG. 3F, the type can be determined by determining the area of block 308 in which a button was pressed. For example, if the user selects a button in area 384, a videographer type event is created. In addition, an event associated with an instance of segment 204 or phrase 206 can be determined by the type of new instance that is created. At step 1304, a sub-type of the event can be identified. For example, a videographer or interviewer event type can have a positive, negative, or informational sub-type. The sub-type can be determined by identifying which button in areas 382 and 384 is selected by the user.

At step 1306, timecodes associated with the event are determined. At step 1308, a comment entered by the user is obtained from the input. At step 1310 an ID is generated for the new instance of event 208. At step 1312, a new instance of event 208 is created. Relationships are created between the new instance and other elements at step 1314.

Figure 13B:
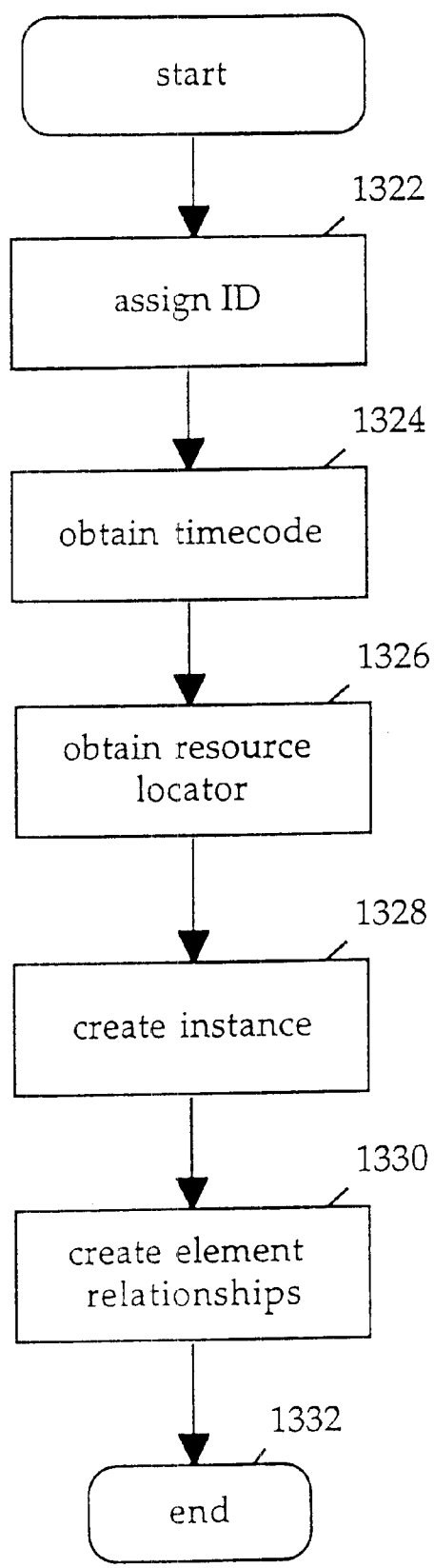
FIG. 13B provides an example of a process flow for creating an instance of an image attribute element according to an embodiment of the invention.

Images can be recorded using the invention. Referring to FIG. 6, block 656 provides an area for entering image information. FIG. 13B provides an example of a process flow for creating an instance of image 220 according to an embodiment of the invention.

At step 1322, an ID is generated for the new instance. At step 1324, a timecode is obtained. In the preferred embodiment, an image is digitized and stored for later review. A resource locator is assigned to the image that identifies the location of the digitized image. The locator is retrieved from user input or otherwise at step 1326. A new instance of image 220 is created at step 1328. Relationships between the new instance and existing element instances are generated at step 1330. The new image is related to an instance of phrase 206, for example.

Relationship Management

New relationships can be formed and existing relationships modified using the relationship management facility of the invention. The relationship management facility can be used to manage relationships between elements such as type 216, keyword 210, proposed keyword 214, and person 218.

Relationship management manages whole/part, association, and inheritance relationships, for example. A whole/part relationship is used between two elements to specify that one element is contained within another element. For example, relationship 228 is a whole/part relationship. That is, phrase 206 is contained within segment 204 via relationship 228. The keyword hierarchy that is established via relationship 242 between instances of keyword 210 represents another example of a whole/part relationship.

An association relationship specifies that two or more elements are related to one another. An association can be implicit or explicit. An implicit association is implied from one or more other relationships. For example, two instances of keyword 210 that occur in the same instance of phrase 206 are implicit associated, or related. An explicit association is formed from a specified relationship. The keyword hierarchy is an explicit association. An explicit association relationship is also established between instances of keyword 210 and thesaural keyword 212 via relationship 238 and between person 218 and thesaural person 222 via relationship 234.

The type hierarchy established by relationship 246 is an example of an inheritance relationship (i.e., "is_a" relationship). Via relationship 246, a child instance of type 216 inherits the properties of its parent instance of type 216. In addition, an instance of keyword 210 inherits the properties of the related instance of type 216 and its parent instances of type 216.

A relationship is considered to be a "parent/child" or an "equal/equal" relationship. A "parent/child" relationship exists in the type and keyword hierarchies. An "equal/equal" relationship exists for phrase 206 and segment 204.

Relationship management includes a user interface to allow the relationship management user to perform the management functions. A processing capability is provided to process operations identified by the user.

Relationship Management User Interface

Figure 7A:
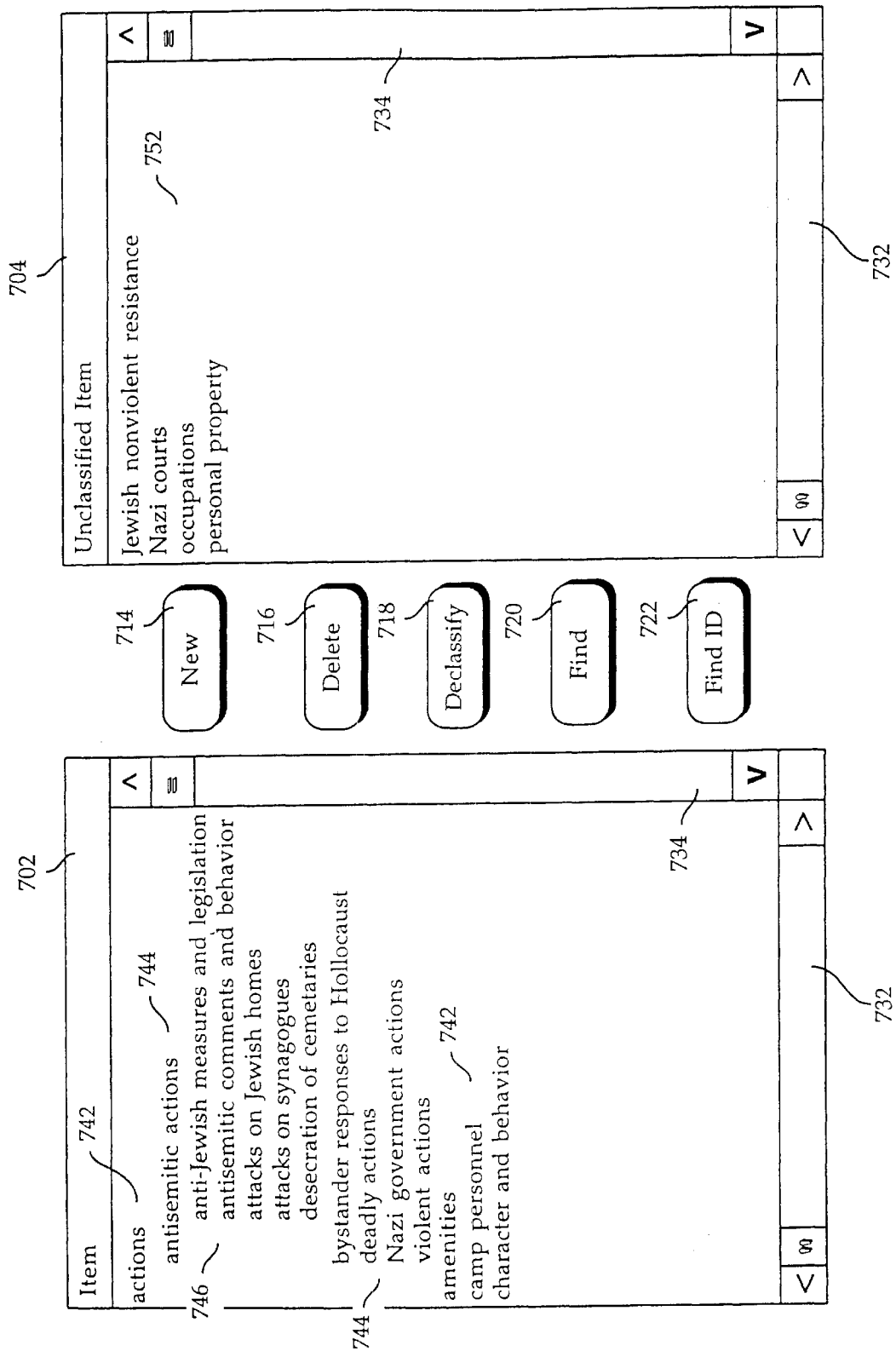
FIGS. 7A–7B provide examples of a relationship management screen according to an embodiment of the invention.
Figure 7B:
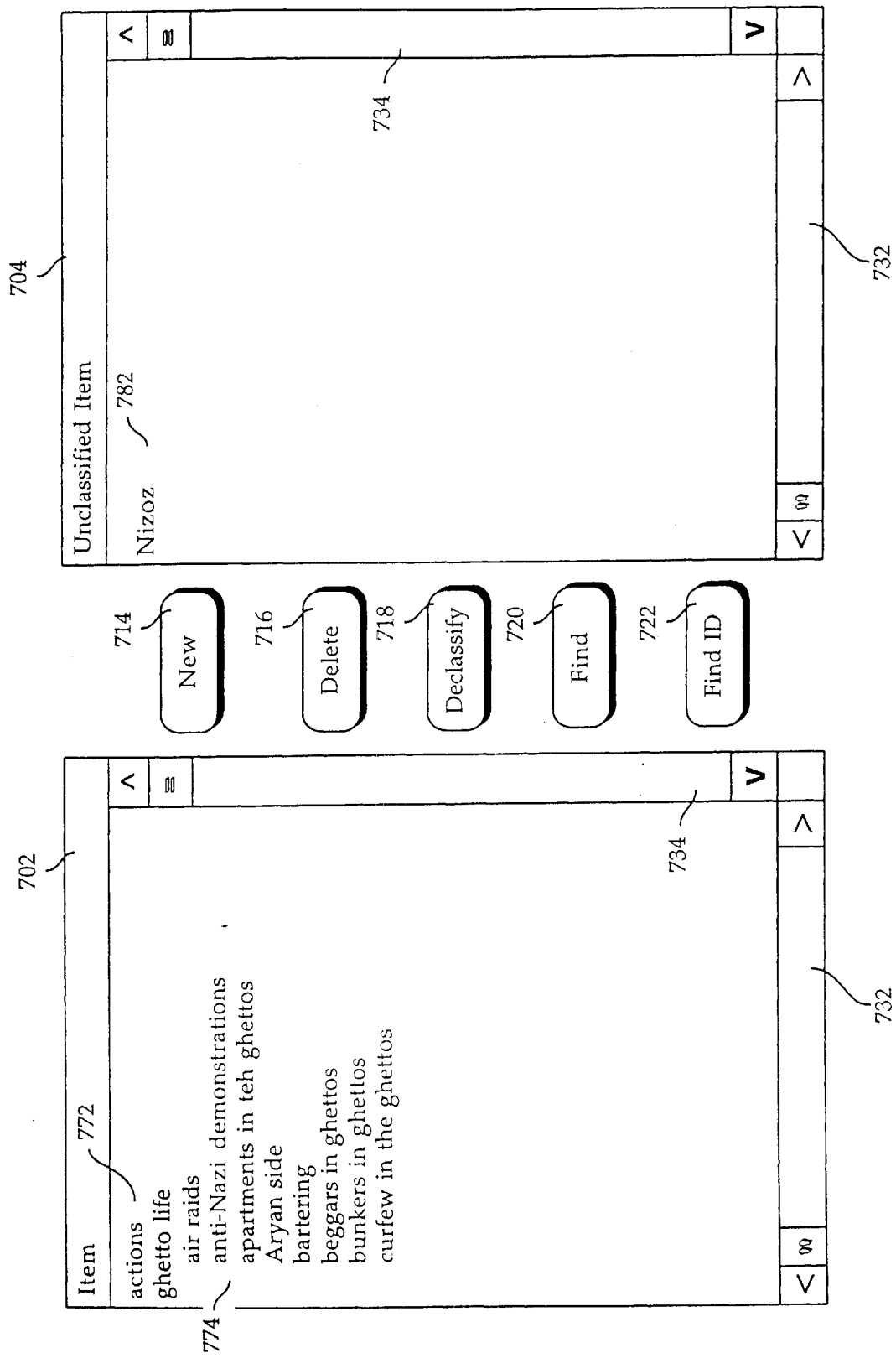

The user interface provides areas to display elements. A drag and drop capability provides a means for graphically specifying element relationships. In addition, control buttons are provided to select management operations. FIGS. 7A–7B provide examples of a relationship management screen according to an embodiment of the invention.

Types are displayed in FIG. 7A. Instances of type 216 are interrelated in a type hierarchy. An example of a type hierarchy is provided in area 702 of FIG. 7A. Level 742 is a root level or level one. Types instances in level 742 are parent instances for type instances in level two (i.e., level 744). and grandparent instances for type instances in level three (i.e., level 746). Level 744 is a parent level for level 746.

Types can be classified or unclassified. An unclassified type is a type instance that has not been inserted into the type hierarchy. A classified type instance has been inserted into the type hierarchy. Classified types are displayed in area 702. Unclassified types are displayed in area 704. A drag and drop capability is provided to allow a user to drag an unclassified type in area 704 into the hierarchy displayed in area 702.

Instances of keyword 210 are displayed in FIG. 7B. Like type instances, keyword instances are interrelated in a hierarchy. Levels 772 and 774 provide an example of a keyword hierarchy. As previously described, a catalogue user can suggest new keywords by creating an instance of proposed keyword 214. The relationship management facility is used to review the proposed keyword instances. Proposed keyword instances are displayed in the unclassified area 704. A proposed keyword can be converted to an instance of keyword 210 by inserting the proposed keyword into the keyword hierarchy. A drag and drop capability is provided to allow a user to drag an unclassified keyword in area 704 into the hierarchy displayed in area 702.

Control buttons are provided to allow a user to specify an operation. Button 714 is used to specify a new element. Referring to FIG. 7B a new keyword can be created in either the classified or unclassified areas (702 and 704, respectively) using button 714. Conversely, an element instance can be deleted using button 716. A classified element can be declassified by selecting the element instance and choosing button 718. Element instances can be found using buttons 720 and 722.

In addition to the control buttons, a drag and drop capability is provided in the relationship management facility. For example, an unclassified element instance can be classified by selecting an element instance and dragging its display from unclassified display area 704 to classified display area 702. The element instance can be inserted into the element hierarchy by selecting the element and dragging its display to the desired hierarchy. An unclassified element can be inserted into a hierarchy using the drag and drop feature. In addition, a classified element can be reclassified in another area of the hierarchy using this feature.

A scrolling feature is provided as illustrated by areas 734 and 732. All of the element instances displayed in areas 702 and 704 can be reviewed using the scrolling capability.

In the preferred embodiment, arrays are maintained to store the information displayed in the screens provided in FIGS. 7A–7B. Information is retrieved for existing elements and stored in these arrays. Information is obtained for an existing element using a technique known in the art. For example, in a relational database management system, one or more queries can be used to select instances of keyword 210 and proposed keyword 214 and their interrelationships. Alternatively, objects associated with an element can be accessed to retrieve the necessary information.

Relationship Management Processing

The relationship management interface screens presented in FIGS. 7A–7B illustrate an interface for viewing element instances and managing their relationships. A relationship management processing capability is used to process user input generated from the relationship management interface screens.

Figure 14A:
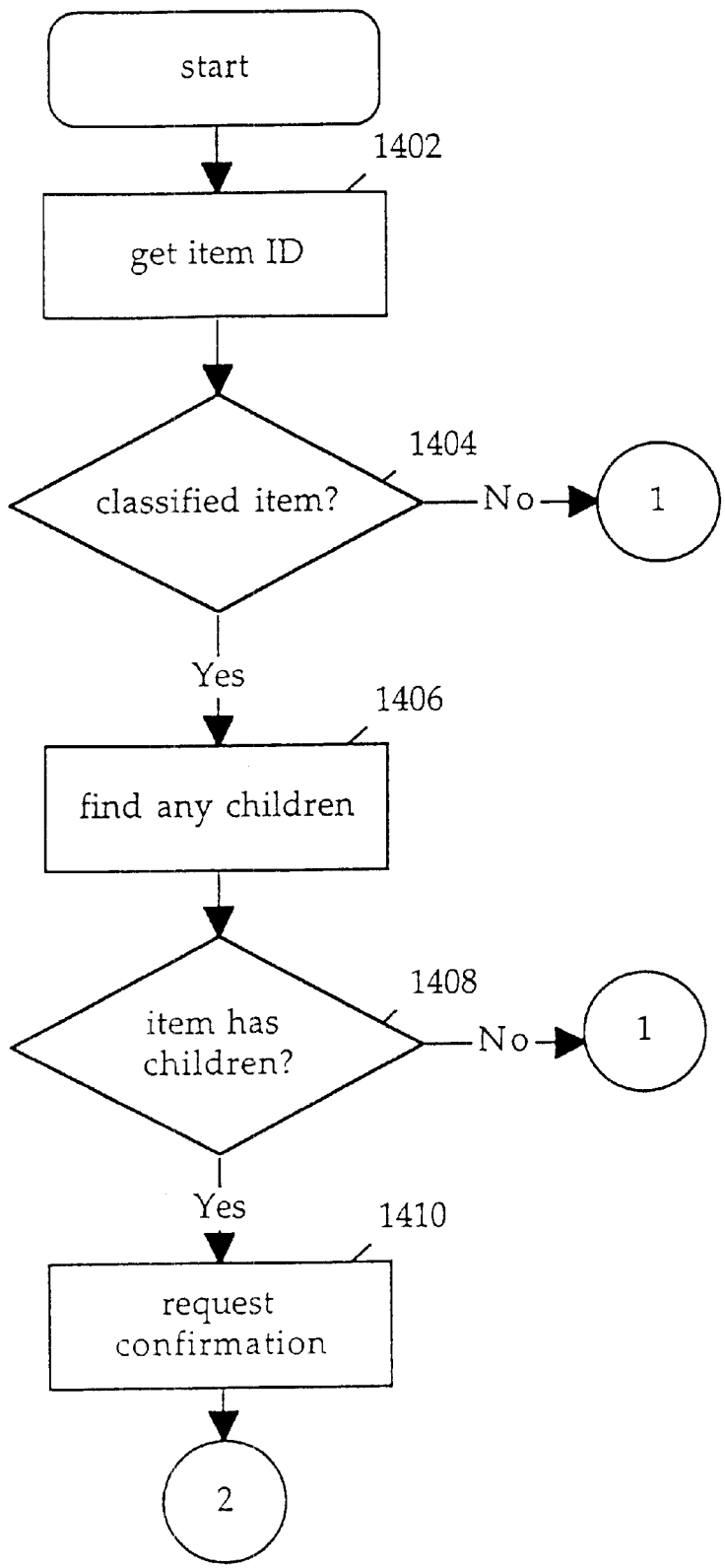
FIGS. 14A–14B provide an example of a process flow according to an embodiment of the invention for a delete operation.
Figure 14B:
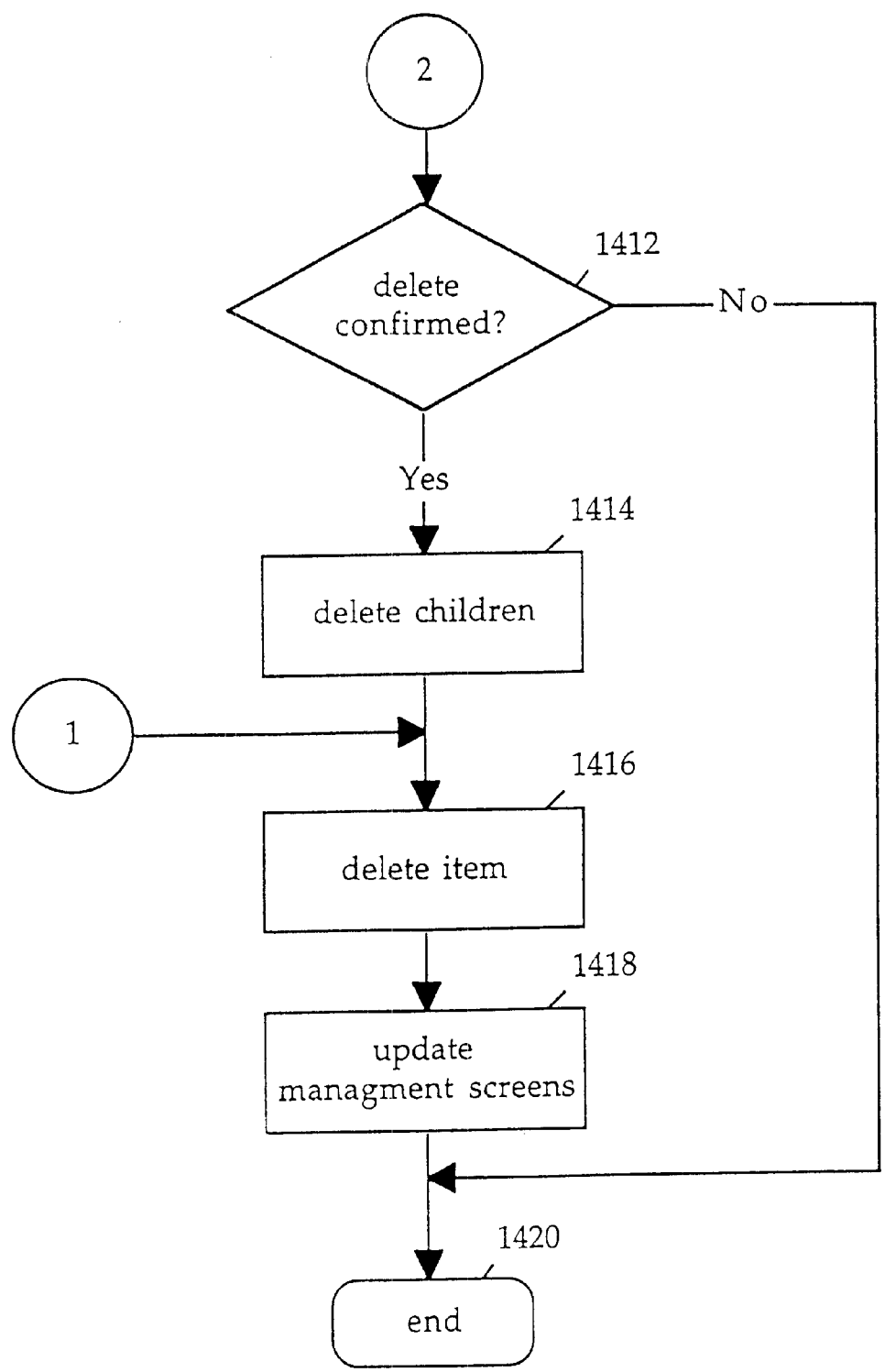

FIGS. 14A–14B provide an example of a process flow according to an embodiment of the invention for a delete operation initiated by selecting button 714 of FIGS. 7A–7B. At step 1402, the ID is identified for the selected element instance. At step 1404 (i.e., "classified item?"), a determination is made whether the selected element instance is a classified element instance. That is, the element instance selected is displayed in viewing area 702 of FIGS. 7A–7B. If the element is not classified, it has not been inserted into an element hierarchy. Therefore, it does not have element relationships and can be deleted. Processing therefore continues at step 1416 to delete the selected item.

If it is determined, at step 1404, that the selected element instance is a classified element, processing continues at step 1406 to find any children of the selected element instance. At step 1408 (i.e., "item has children?"), a determination is made whether the selected element instance has any children. If not, processing continues at step 1416 to delete the selected item. If the selected item does have children, processing continues at step 1410 to request confirmation from the user to continue with the delete process.

At step 1412 (i.e., "delete confirmed?"), if the delete operation is not confirmed by the user, processing ends for the current delete operation at step 1420. If it is determined, at step 1412, that the user confirms the delete, processing continues at step 1414 to delete the selected item's children. Once the child instances have been deleted, processing continues at step 1416 to delete the selected item. Processing continues at step 1418 to update the relationship management screens and associated arrays to reflect the deletion of the selected item as well as any children of the selected item.

Figure 15A:
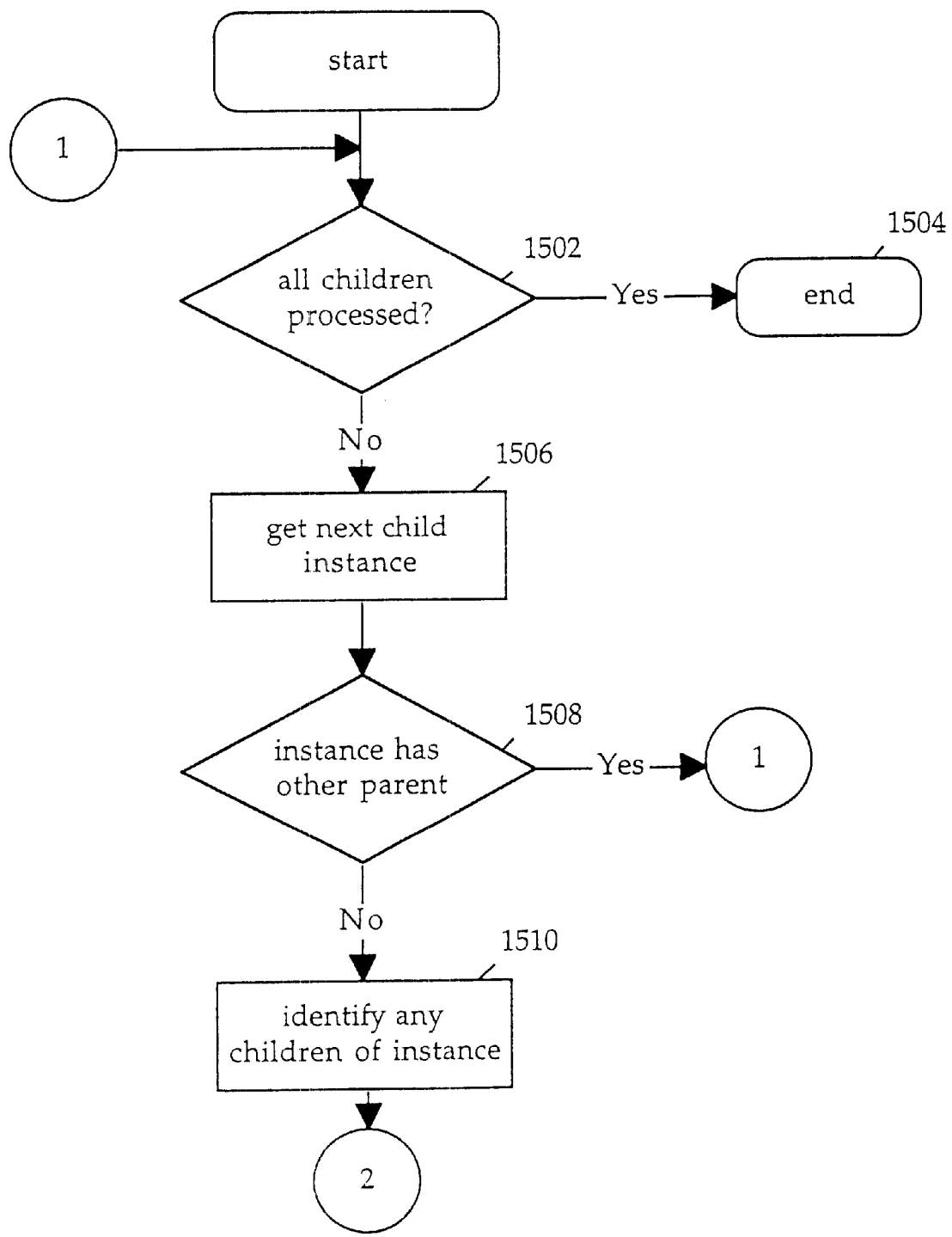
FIGS. 15A–15B provide an example of a process flow for deleting children according to an embodiment of the invention.
Figure 15B:
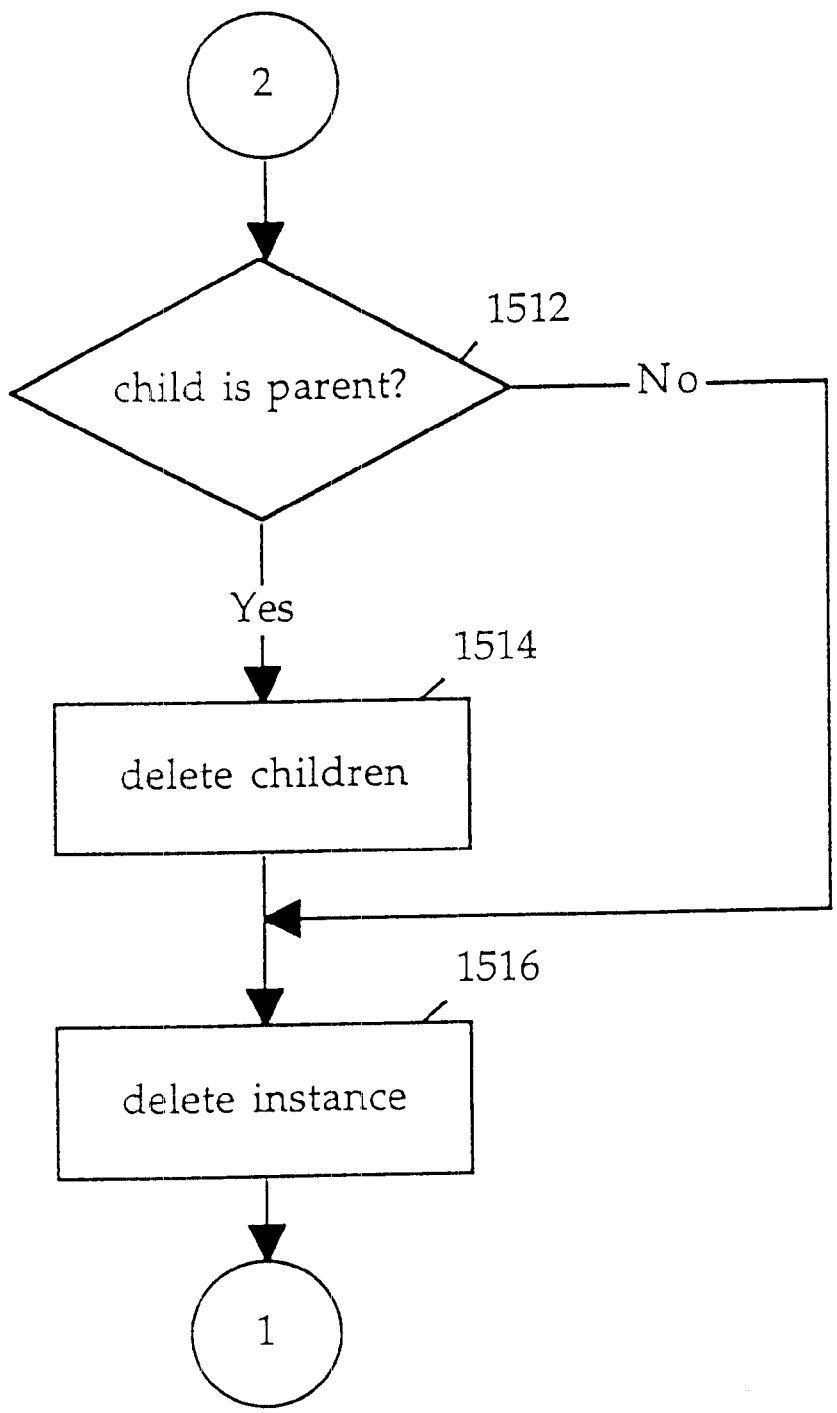

In the process of deleting a selected item's children, a child instance may be encountered that is a parent instance of one or more element instances. The delete process of the invention can be used to delete such child instances. FIGS. 15A–15B provide an example of a process flow for deleting children according to an embodiment of the invention.

At step 1502 (i.e., "all children processed?"), a determination is made whether all of a parent instance's children have been deleted. If yes, processing ends for the current parent instance at step 1504. If not, processing continues at step 1506 to get the next child instance of the parent instance. At step 1508 (i.e., "instance has other parent?"), a determination is made whether the current child instance has a parent other than the parent instance that has been selected for deletion. If so, there is no need to delete the current child instance and processing continues at step 1502 to process any remaining child instances. If not, processing continues at step 1510 to identify any child instances of the current child instance. At step 1512 (i.e., "child is parent?"), a determination is made whether any child instances were located for the current child instance in step 1510. If not, processing continues at step 1516 to delete the current child instance and then returns to step 1502 to process any remaining child instances.

If it is determined, at step 1512, that the current child instance is a parent instance, processing continues at step 1514 to invoke the process flow of FIGS. 15A–15B to delete the child instances of the current child instance. That is, the process flow is invoked recursively to delete multiple hierarchical levels beginning with the first child level of the element instance selected for deletion. Each call to the process flow deletes a child level in the hierarchy. However, a child level is preferably not deleted until all of the children of that level have been deleted. When the child levels have been deleted, processing continues at step 1516 to delete the current child instance. Processing then continues at step 1502 to process any remaining child instances.

Figure 16:
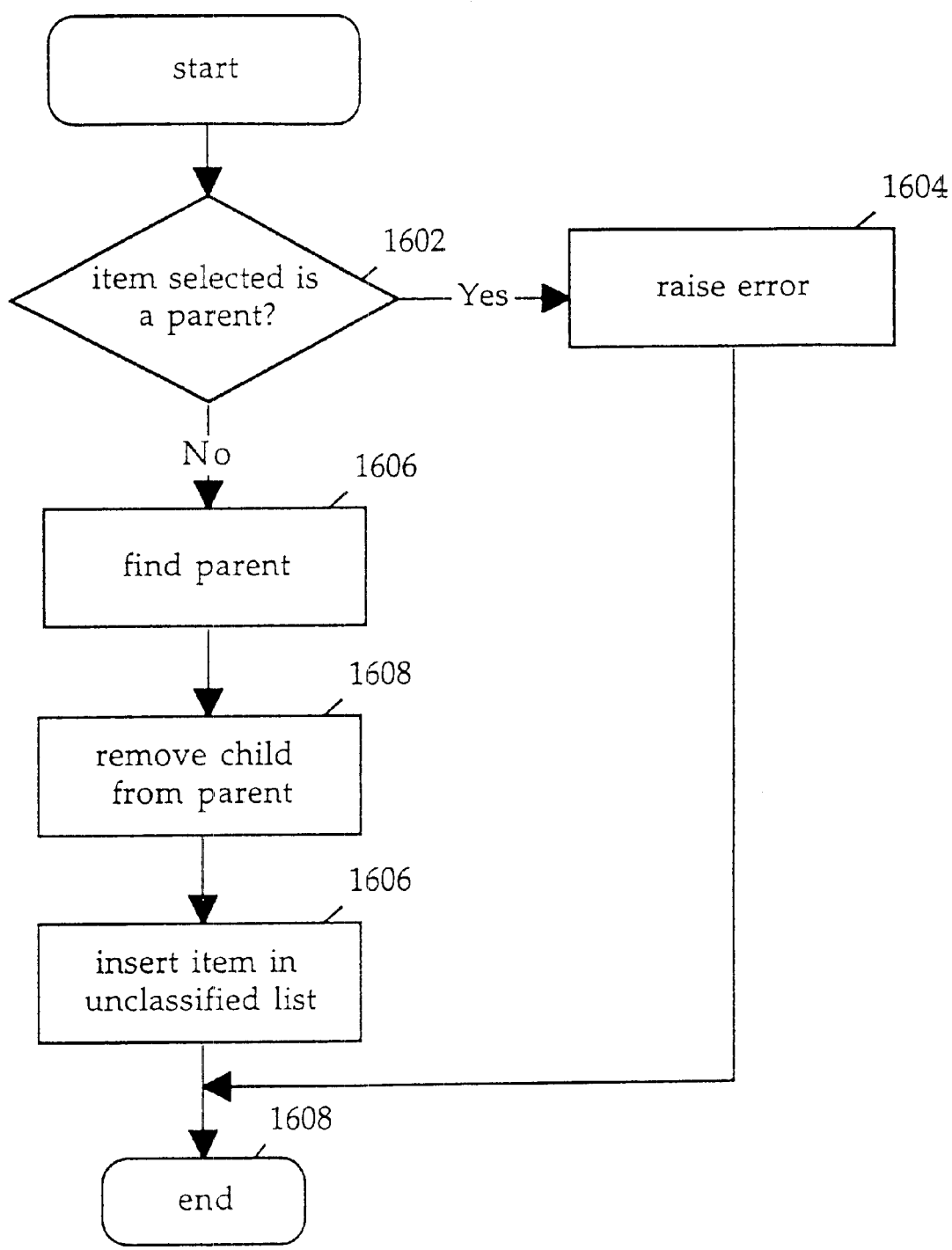
FIG. 16 provides a process flow for declassifying an element according to an embodiment of the invention.

A classified element can be declassified by selecting the element and either selecting button 718 or dragging the element from area 702 to area 704. FIG. 16 provides a process flow for declassifying an element according to an embodiment of the invention.

At step 1602 (i.e., "item selected is a parent?"), a determination is made whether the element selected is a parent. If yes, an error is raised at step 1604 and processing for the current declassify operation ends. If not, processing continues at step 1606 to find the parent of the selected element. At step 1608, the relationship between the parent and child elements is removed. At step 1606, the selected element is inserted into area 704 (e.g., the relationship management screens and arrays are updated). Processing ends for the current declassification operation at step 1608.

Figure 17:
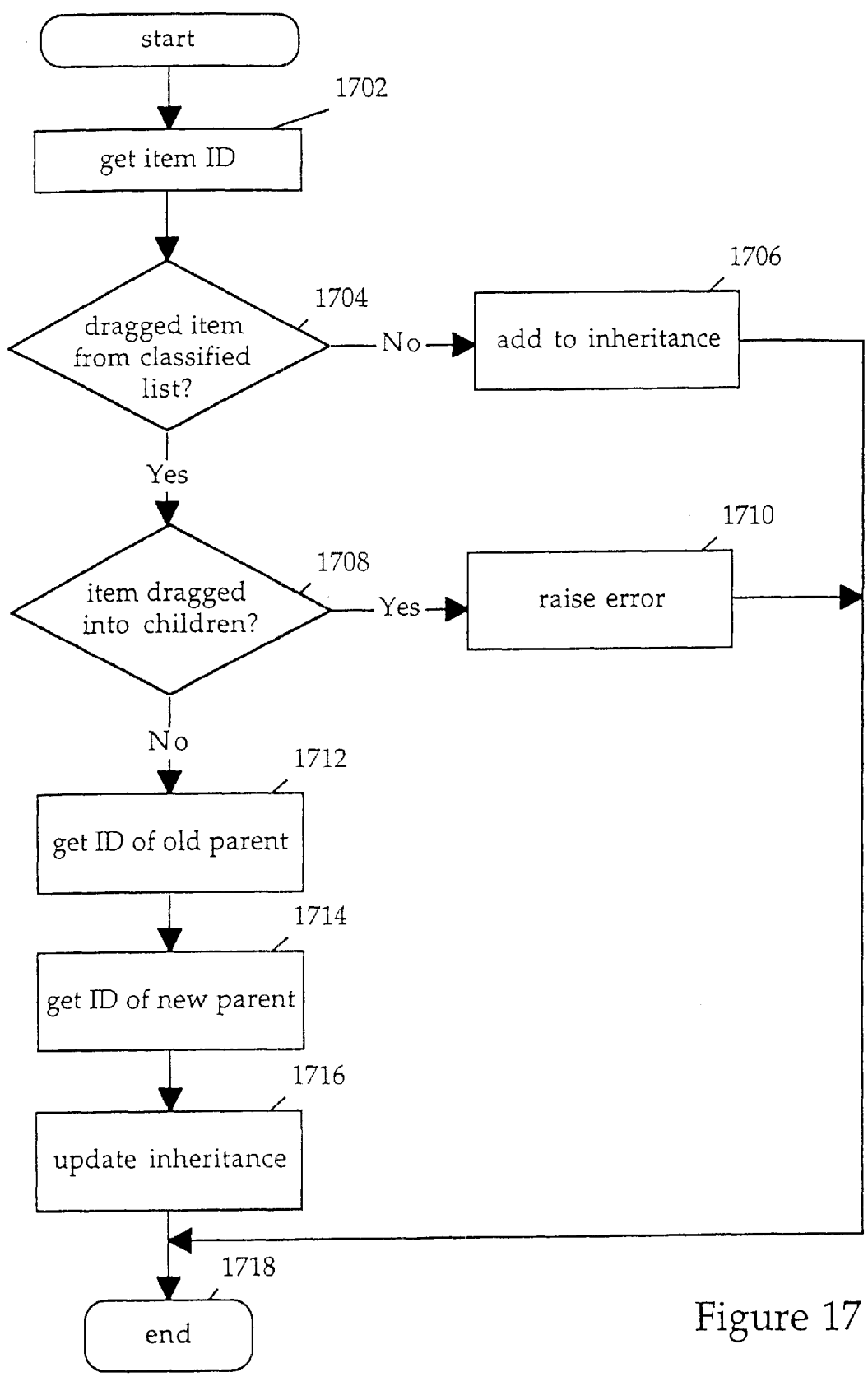
FIG. 17 provides an example of a process flow for handling a drag and drop operation according to an embodiment of the invention.

As previously indicated, a drag and drop facility is provided. FIG. 17 provides an example of a process flow for handling a drag and drop operation according to an embodiment of the invention. The ID of the item selected by the user is obtained at step 1702. At step 1704 (i.e., "dragged item from classified list?"), a determination is made whether the selected item is being dragged from the classified list. If not (i.e., the selected item is being dragged from the unclassified list), processing continues at step 1706 to add the selected item to the hierarchy based on the final location of the cursor in the drag operation. That is, the parent level is identified for the selected item. The element that is represented in the parent level is located and a relationship is formed between the parent element and the new child element (i.e., the selected item).

If it is determined, at step 1704, that the item is being dragged within the classified list, processing continues at step 1708. At step 1708 (i.e., "item dragged into children?"), a determination is made whether a parent element is being inserted into a child level. If so, processing continues at step 1710 to raise an error and processing of the current drag operation terminates at step 1718.

If it is determined, at step 1708, that a parent level is not being dragged into a child level, processing continues at step 1712. That is, an element is being transferred from one branch of the hierarchy to another, for example. The ID of the old parent instance is identified at step 1712. The ID of the new parent instance is identified at step 1714. The hierarchical relationships are updated for the old and new parent instances at step 1716. Processing for the current drag and drop operation ends at step 1718.

Catalogue Instances

Figure 18A:
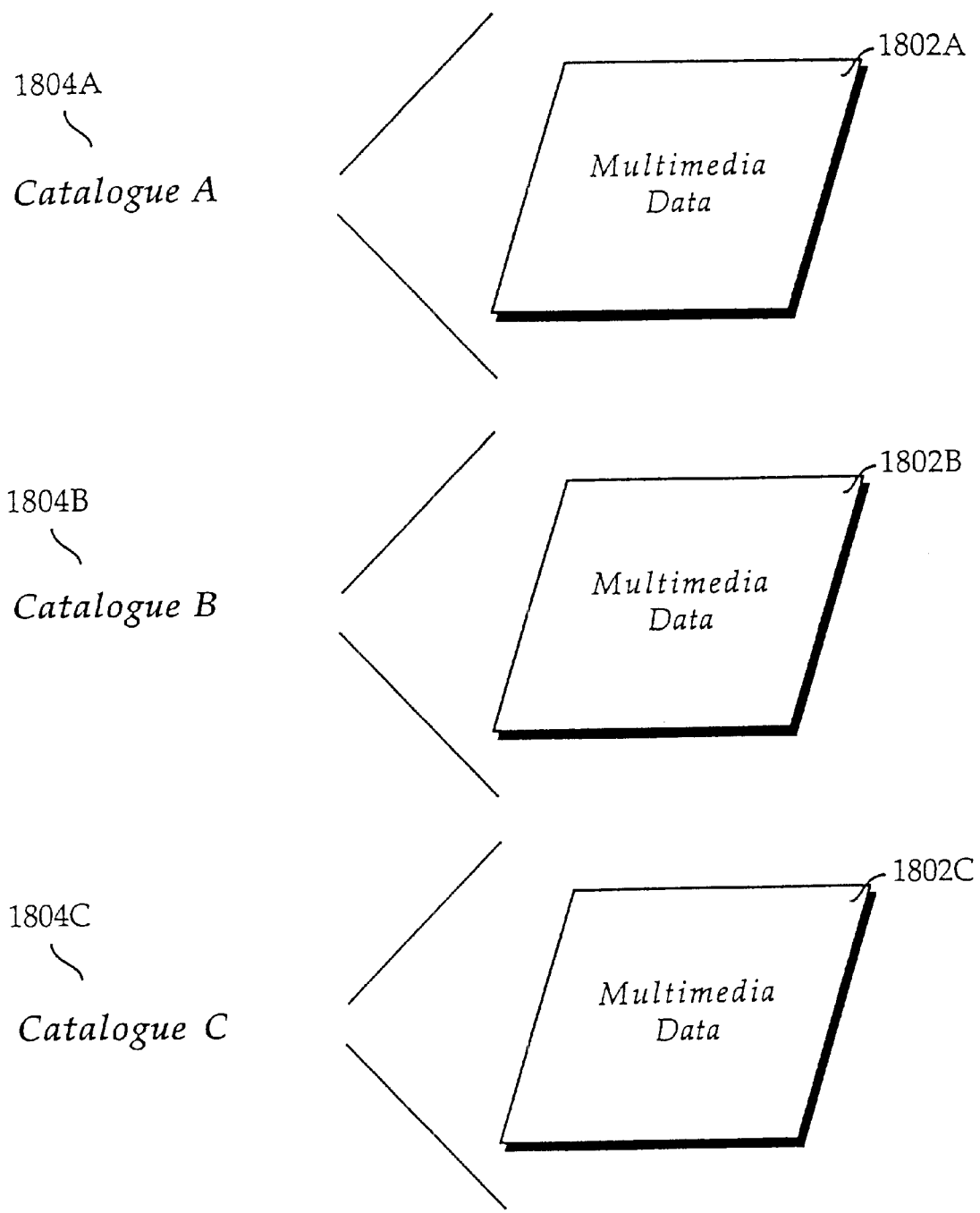
FIGS. 18A–18B provide illustrations of catalogue instances according to embodiments of the invention.
Figure 18B:
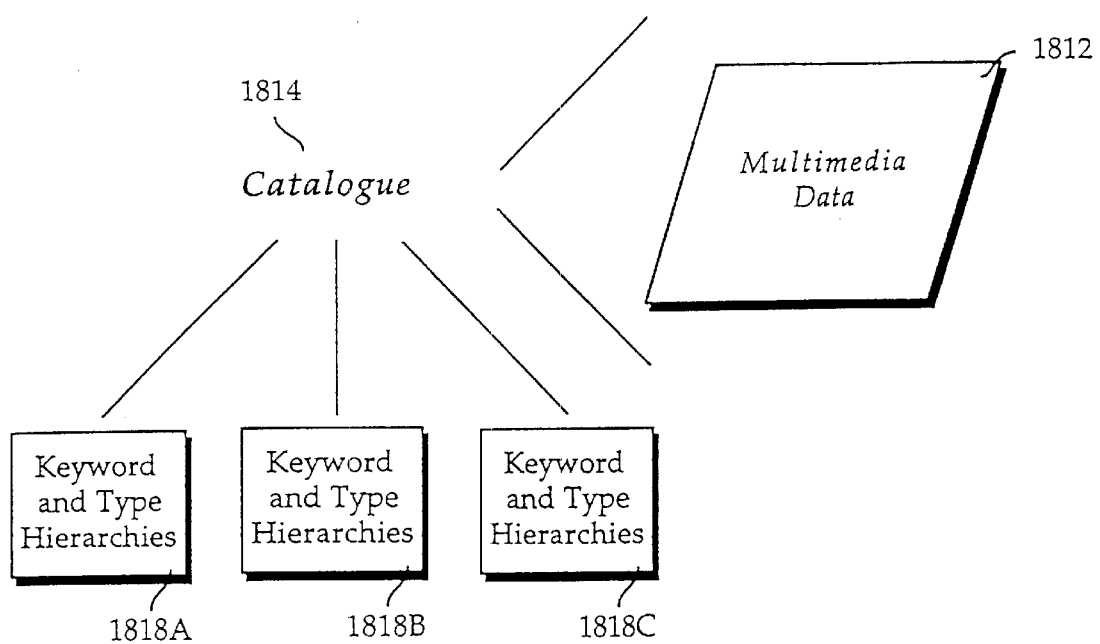

As previously discussed, the elements illustrated in FIGS. 2A–2B and 2D–2E can be used to catalogue multimedia data. These elements can be used to catalogue different multimedia data. Using these elements, a catalogue can be created for any multimedia. Further, the same catalogue can use alternate thesauruses to specify the multimedia data. FIGS. 18A–18B provide illustrations of catalogue instances according to embodiments of the invention.

Referring to FIG. 18A, multimedia data 1802A uses catalogue A. Multimedia data 1802A can include, for example, a series of videotaped interviews and other multimedia data referenced therein (e.g., stills and video). An instance of segment 204 (e.g., an interview segment) identifies a portion of the videotape in a videotape library that is associated with an interview. Catalogue A has a plurality of instances of phrase 206 each associated with a portion of multimedia data 1802A. Each instance of phrase 206 has one or more attributes and/or attribute elements. Attributes such as an in timecode and an out timecode identify a portion of the video from an interview that is associated with an instance of phrase 206.

An instance of phrase 206 has a descriptive phrase attribute. In addition, an instance of phrase 206 has a plurality of associated instances of keyword 210, images/video 220, person 218, proposed keyword 214, and proposed person 224. At least one instance of person 218 is associated with the interview segment (i.e., the instance of segment 204 that is associate with an interview). Other instances of person 218 can be used to identify each person referenced in a portion of the data.

Instances of person information 226 can be used to retain background information for each person. Person information 226 can be customized to accommodate any type of multimedia data. For example, if the multimedia data contains interviews of survivors of the Holocaust, an instance of person information such as concentration camp, concentration camp job, deportation information, and liberation data.

One or more instances of keyword 210 are identified for each instance of phrase 206. One or more instances of type 216 are instantiated and interrelated to form a type hierarchy that can be used to classify the instances of keyword 210. One or more instances of thesaural keyword 212 can be associated with an instance of keyword. A thesaural keyword 212 contains a label that can be used to identify content of an instance of phrase 206.

Instances of proposed keyword 214 and proposed person 224 can be associated with an instance of phrase 206 during cataloguing as discussed above. These instances are either transformed into instances of keyword 210 or person 218 (respectively) or deleted. Thus, all instances of proposed keyword 214 and proposed person 224 are resolved during cataloguing. An instance of image/video 220 can be used for an image or video that is referenced during an interview.

The elements described can also be instantiated to catalogue multimedia data 1802B and 1802C. Multimedia data 1802B and 1802C use catalogues B and C, for example. Multimedia data 1802A can include, for example, audio or videotaped sports events and other multimedia data referenced therein (e.g., stills and video). An instance of segment 204 (e.g., an event segment) identifies a audio or videotaped event, for example. Catalogue B has a plurality of instances of phrase 206 each associated with a portion of multimedia data 1802B. Each instance of phrase 206 has one or more attributes and/or attribute elements. Attributes such as an in timecode and an out timecode identify a portion of the video from an event that is associated with an instance of phrase 206.

An instance of phrase 206 has a descriptive phrase attribute. In addition, an instance of phrase 206 has a plurality of associated instances of keyword 210, images/video 220, person 218, proposed keyword 214, and proposed person 224. At least one instance of person 218 is associated with the event segment (i.e., the instance of segment 204 that is associated with an event). Other instances of person 218 can be used to identify each person referenced in a data portion.

Instances of person information 226 can be used to retain background information for each person. In this case, person information 226 can be customized to contain such information as a player's statistics and previous playing experiences (e.g., scholastic teams and rookie year information).

One or more instances of keyword 210 are identified for each instance of phrase 206. One or more instances of type 216 are instantiated and interrelated to form a type hierarchy that can be used to classify the instances of keyword 210. One or more instances of thesaural keyword 212 can be associated with an instance of keyword. Instances of proposed keyword 214 and proposed person 224 can be identified with an instance of phrase 206 and resolved during cataloguing.

Multimedia data 1802C can contain other data for which a catalogue can be used to organize the data for storage and retrieval. Instances of keyword 210, type 216, and person 218 can be instantiated and associated with each catalogue instance (e.g., an instance of phrase 206). Instances of keyword 210 and its associated instances of thesaural keyword 212 can be used to identify the content of a portion of multimedia data associated with the instance of keyword and its associated instance of phrase 206. Hierarchical relationships can be formed from the instances of keyword 210 and type 216. Person information 226 can be customized to contain attributes for an instance of person 218 to accommodate the type of data contained in multimedia data 1802C.

Within a catalogue, multiple thesauruses can be created for the same multimedia data. For example, more than one thesaurus can be created for catalogues A, B, or C in FIG. 15A. A thesaurus can be defined using the keyword and type hierarchies formed from instances of keyword 210 and type 216. FIG. 18B illustrates a catalogue having multiple keyword and type hierarchies. Multimedia data 1812 uses catalogue 1814. Catalogue 1814 is associated with thesauruses 1818A, 1818B, and 1818C.

Catalogue 1814 is comprised of one or more instances of phrase 206. Each instance of phrase 206 is associated with one or more instances of keyword 210 contained in thesaurus 1818A. An instance of keyword 210 in thesaurus 1818A identifies one alternative specification of content for an instance of phrase 206. Each instance of keyword 210 is associated with an instance of type 216 in thesaurus 1818A. As previously discussed, alternative content specifications can be retained using one or more instances of thesaural keyword 212 associated with an instance of keyword 210. In addition, content can be varied using alternative instances of keyword 210.

An instance of phrase 206 can be associated with one or more instances of keyword 210 contained in thesaurus 1818B or 1818C. An instance of keyword 210 in thesaurus 1818B identifies another alternative specification of content for an instance of phrase 206. Similarly, thesaurus 1818C can contain another alternative specification of content for an instance of phrase 206. Thus, the nature of the catalogue associated with multimedia data 1812 can be varied within a thesaurus or across multiple thesauruses.

Thus, a method and apparatus for cataloguing multimedia data has been provided.

What is claimed is:

1. A method of cataloguing multimedia data comprising the steps of:

specifying a description for a portion of said multimedia data;

creating a catalogue element for said portion of said multimedia data;

creating a plurality of attributes and attribute elements; and creating a plurality of relationships between said catalogue element and said plurality of attributes and attribute elements.

2. The method of claim 1 wherein said step of creating a plurality of relationships further comprises the steps of:

identifying references to a plurality of existing attribute elements in said description; and creating a plurality of relationships between said catalogue element and said plurality of existing attribute elements.

3. The method of claim 1 wherein said attribute element is a proposed element, said method further comprising the steps of:

examining said proposed element to determine whether it is an approved element;

transforming said proposed element into an existing attribute element when said proposed element is an approved element;

deleting said proposed element when said proposed element is an unapproved element.

4. The method of claim 3 wherein said step of transforming further comprises the step of inserting said proposed element into a hierarchy of elements.

5. The method of claim 1 wherein one of said plurality of relationships is a hierarchical relationship.

6. The method of claim 1 wherein one of said plurality of attribute elements is a thesaural element for use as an alternate for another element, said step of creating a plurality of relationships further comprises the steps of:

identifying said another element;

creating a relationship between said thesaural element and said another element.

7. The method of claim 1 further comprising the step of deleting said catalogue element from said index.

8. The method of claim 7 wherein said step of deleting further comprises the steps of:

identifying said plurality of attributes and attribute elements;

reassigning said plurality of attributes and attribute elements when said plurality of attributes and attribute elements can be reassigned;

deleting said plurality of attributes and attribute elements when said plurality of related attributes and attribute elements cannot be reassigned;

deleting said catalogue element.

9. The method of claim 8 wherein said step of reassigning further comprises the step of modifying relationships between said catalogue element and said plurality of attributes and attribute elements such that said plurality of attributes and attribute elements are no longer related to said catalogue element.

10. The method of claim 8 wherein said step of deleting further comprises the steps of:

locating a second plurality of attributes and attribute elements, said second plurality of attributes and attribute elements are related to said plurality of attributes and attribute elements;

reassigning said second plurality of attributes and attribute elements when said second plurality of attributes and attribute elements can be reassigned;

deleting said second plurality of attributes and attribute elements when said second plurality of attributes and attribute elements cannot be reassigned;

deleting said plurality of attributes and attribute elements.

11. The method of claim 1 further comprising the step of creating an event element for a second portion of said multimedia data, said event element represents an event associated with said second portion of said multimedia data.

12. The method of claim 11 wherein said event element represents a quality assurance event.

13. The article of manufacture of claim 8 wherein said program code configured to cause said computer to reassign further comprises computer readable program code configured to cause a computer to modify relationships between said catalogue element and said plurality attributes and attribute elements such that said plurality of attributes and attribute elements are no longer related to said index element.

14. An article of manufacture comprising:

a computer usable medium having computer readable program code embodied therein for cataloguing multimedia data using a general indexing structure, the computer readable program code in said article of manufacture comprising;

computer readable program code configured to cause a computer to specify a description for a portion of said multimedia data;

computer readable program code configured to cause a computer to create a catalogue element for said portion of said multimedia data;

computer readable program code configured to cause a computer to create a plurality of attributes and attribute elements; and computer readable program code configured to cause a computer to create a plurality of relationships between said catalogue element and said plurality of attributes and attribute elements.

15. The article of manufacture of claim 14 wherein said program code configured to cause a computer to create a plurality of relationships further comprises the steps of:

computer readable program code configured to cause a computer to identify references to a plurality of existing attribute elements in said description;

computer readable program code configured to cause a computer to create a plurality of relationships between said catalogue element and said plurality of existing attribute elements.

16. The article of manufacture of claim 14 wherein said index element is a proposed index element, said program code further comprising:

computer readable program code configured to cause a computer to examine said proposed element to determine whether it is an approved element;

computer readable program code configured to cause a computer to transform said proposed element into an existing attribute element when said proposed element is an approved element;

computer readable program code configured to cause a computer to delete said proposed element when said proposed element is an unapproved element.

17. The article of manufacture of claim 16 wherein said program code configured to cause a computer to transform further comprises computer readable program code configured to cause a computer to insert said proposed element into a hierarchy of elements.

18. The article of manufacture of claim 14 wherein one of said plurality of relationships is a hierarchical relationship.

19. The article of manufacture of claim 14 wherein one of said plurality of attribute elements is a thesaural element for use as an alternate for another element, said program code configured to create a plurality of relationships further comprises:
   computer readable program code configured to cause a computer to identify said another element;
   computer readable program code configured to cause a computer to create a relationship between said thesaural element and said another element.

20. The article of manufacture of claim 14 further comprising computer readable program code configured to cause a computer to delete said catalogue element.

21. The article of manufacture of claim 20 wherein program code configured to cause a computer to delete further comprises:
   computer readable program code configured to cause a computer to identify said plurality of attributes and attribute elements;
   computer readable program code configured to cause a computer to reassign said plurality of attributes and attribute elements when said plurality of attributes and attribute elements can be reassigned;
   computer readable program code configured to cause a computer to delete said plurality of attributes and attribute elements when said plurality of attributes and attribute elements cannot be reassigned;
   computer readable program code configured to cause a computer to delete said catalogue element.

22. The article of manufacture of claim 21 wherein said program code configured to cause a computer to delete further comprises:
   computer readable program code configured to cause a computer to locate a second plurality of attributes and attribute elements, said plurality of attributes and attribute elements are related to said plurality of attributes and attribute elements;
   computer readable program code configured to cause a computer to reassign said second plurality of attributes and attribute elements when said second plurality of attributes and attribute elements can be reassigned;
   computer readable program code configured to cause a computer to delete said second plurality of attributes and attribute elements when said second plurality of attributes and attribute elements cannot be reassigned;
   computer readable program code configured to cause a computer to delete said plurality of attributes and attribute elements.

23. The article of manufacture of claim 14 further comprising computer readable program code configured to cause a computer to create an event for a second portion of said multimedia data, said event represents an event associated with said second portion of said multimedia data.

24. The article of manufacture of claim 23 wherein said event represents a quality assurance event.

25. A method of managing the quality of data collection of multimedia data comprising the steps of:
   reviewing said multimedia data;
   creating an event, said event containing information regarding the quality of data collection;
   associating said event with a portion of said multimedia data.

26. The article of manufacture of claim 25 further comprising the steps of
   recalling said portion of said multimedia data using said event;
   reviewing said multimedia data to assess the quality of data collection for said portion of said multimedia data.

27. A system for cataloguing multimedia data comprising:
   a processing unit;
   a cataloguing facility coupled to said processing unit;
   a relationship management facility coupled to said processing unit;
   a plurality of index elements coupled to cataloguing facility and said relationship management facility.

28. The system of claim 27 wherein said cataloguing facility comprises:
   a cataloguing interface;
   a plurality of cataloguing processes coupled to said cataloguing interface.

29. The system of claim 27 wherein said relationship management facility comprises:
   a relationship management interface;
   a plurality of relationship management processes coupled to said relationship management interface.

30. A method of creating an alternate catalogue for multimedia data comprising the steps of:
   creating a first catalogue for said multimedia data, said catalogue containing one or more catalogue elements;
   creating a first set of keywords associated with said one or more catalogue elements;
   creating a second set of keywords associated with said one or more catalogue elements.

31. The method of claim 30 further comprising the steps of:
   creating a first set of types associated with said first set of keywords; and
   creating a second set of types associated with said second set of keywords.

32. The method of claim 31 wherein said first and second sets of types are interrelated to form a hierarchy of types.

33. The method of claim 30 wherein said first and second sets of keywords are interrelated to form a hierarchy of keywords.

34. The method of claim 30 wherein one or more keywords in said first set of keywords is associated with a first thesaural keyword element having a first value and a second thesaural keyword element having a second value.

* * * * *